US008659268B2

(12) United States Patent
Krishnan et al.

(10) Patent No.: US 8,659,268 B2
(45) Date of Patent: Feb. 25, 2014

(54) ELECTROCHEMICAL CELL WITH STEPPED SCAFFOLD FUEL ANODE

(75) Inventors: Ramkumar Krishnan, Gilbert, AZ (US); Grant Friesen, Gilbert, AZ (US); Cody A. Friesen, Fort McDowell, AZ (US)

(73) Assignee: Fluidic, Inc., Scottsdale, AZ (US)

( * ) Notice: Subject to any disclaimer, the term of this patent is extended or adjusted under 35 U.S.C. 154(b) by 221 days.

(21) Appl. No.: 13/167,930

(22) Filed: Jun. 24, 2011

(65) Prior Publication Data

US 2011/0316485 A1 Dec. 29, 2011

Related U.S. Application Data

(60) Provisional application No. 61/358,339, filed on Jun. 24, 2010.

(51) Int. Cl.
*H02J 7/00* (2006.01)

(52) U.S. Cl.
USPC .......................................... 320/137; 429/188

(58) Field of Classification Search
USPC ................... 320/128, 137; 429/122, 188, 488
See application file for complete search history.

(56) References Cited

U.S. PATENT DOCUMENTS

| 2,083,364 | A | 6/1937 | Cook, Jr. |
| 3,219,486 | A | 11/1965 | Gumucio |
| 3,223,611 | A | 12/1965 | Wells |
| 3,338,746 | A | 8/1967 | Plust |
| 3,483,036 | A | 12/1969 | Gregor |
| 3,525,643 | A | 8/1970 | Spahrbier |
| 3,532,548 | A | 10/1970 | Stachurski |
| 3,615,843 | A | 10/1971 | Moran |
| 3,615,844 | A | 10/1971 | Spengler |
| 3,650,837 | A | 3/1972 | Palmer |
| 3,713,892 | A | 1/1973 | Moran |
| 3,716,413 | A | 2/1973 | Eisner |

(Continued)

FOREIGN PATENT DOCUMENTS

| CN | 100037 | 1/2012 |
| EP | 0058090 | 8/1982 |

(Continued)

OTHER PUBLICATIONS

International Search Report and Written Opinion for PCT International Patent Application No. PCT/US2011/041748, mailed Oct. 5, 2011.

(Continued)

*Primary Examiner* — Edward Tso
*Assistant Examiner* — Aaron Piggush
(74) *Attorney, Agent, or Firm* — Pillsbury Winthrop Shaw Pittman, LLP

(57) ABSTRACT

An electrochemical cell includes a fuel electrode configured to operate as an anode to oxidize a fuel when connected to a load, and configured to operate as a cathode when connected to a power supply. The fuel electrode comprises a plurality of scaffolded electrode bodies, wherein the scaffolded electrode bodies are of varying size. The electrode bodies are of a larger size at positions distal from a charging electrode configured to act as an anode when connected to the power supply, and of a smaller size at positions proximal to the charging electrode. When connected to a load, the scaffolded electrode bodies-containing fuel electrode acts as the electrochemical cell anode and electrodeposited fuel is oxidized.

38 Claims, 18 Drawing Sheets

(56) References Cited

U.S. PATENT DOCUMENTS

| | | |
|---|---|---|
| 3,717,505 A | 2/1973 | Unkle, Jr. |
| 3,728,244 A | 4/1973 | Cooley |
| 3,785,868 A | 1/1974 | Devitt |
| 3,801,376 A | 4/1974 | Lindstrom |
| 3,822,149 A | 7/1974 | Hale |
| 3,840,455 A | 10/1974 | Cooley |
| 3,850,696 A | 11/1974 | Summers |
| 3,886,426 A | 5/1975 | Daggett |
| 3,919,062 A | 11/1975 | Lundquist, Jr. |
| 3,972,727 A | 8/1976 | Cohn |
| 4,119,772 A | 10/1978 | Peters |
| 4,201,653 A | 5/1980 | ONeill |
| 4,312,927 A | 1/1982 | Salmon |
| 4,317,863 A | 3/1982 | Struthers |
| 4,340,449 A | 7/1982 | Srinivasan |
| 4,385,101 A | 5/1983 | Catanzarite |
| 4,385,967 A | 5/1983 | Brady |
| 4,447,504 A | 5/1984 | Goebel |
| 4,461,817 A | 7/1984 | Itoh |
| 4,521,497 A | 6/1985 | Tamminen |
| 4,581,064 A | 4/1986 | Morrison |
| 4,684,585 A | 8/1987 | Tamminen |
| 4,693,946 A | 9/1987 | Niksa |
| 4,732,823 A | 3/1988 | Ito |
| 4,871,627 A | 10/1989 | Strong |
| 4,894,355 A | 1/1990 | Takeuchi |
| 5,009,755 A | 4/1991 | Shor |
| 5,104,497 A | 4/1992 | Tetzlaff |
| 5,185,218 A | 2/1993 | Brokman |
| 5,190,833 A | 3/1993 | Goldstein |
| 5,318,861 A * | 6/1994 | Harats et al. ............... 429/404 |
| 5,376,471 A | 12/1994 | Hunter |
| 5,415,949 A | 5/1995 | Stone |
| 5,431,823 A | 7/1995 | Gofer |
| 5,434,020 A | 7/1995 | Cooper |
| 5,439,758 A | 8/1995 | Stone |
| 5,458,988 A | 10/1995 | Putt |
| 5,567,540 A | 10/1996 | Stone |
| 5,650,240 A | 7/1997 | Rogers |
| 5,652,068 A | 7/1997 | Shuster |
| 5,733,677 A | 3/1998 | Golovin |
| 5,850,136 A | 12/1998 | Kaneko |
| 5,935,724 A | 8/1999 | Spillman |
| 5,935,728 A | 8/1999 | Spillman |
| 5,938,899 A | 8/1999 | Forand |
| 5,972,531 A | 10/1999 | Kawakami |
| 5,998,967 A | 12/1999 | Umeki |
| 6,014,013 A | 1/2000 | Suppanz |
| 6,025,696 A | 2/2000 | Lenhart |
| 6,027,834 A | 2/2000 | Hayashi |
| 6,034,506 A | 3/2000 | Hall |
| 6,046,514 A | 4/2000 | Rouillard |
| 6,054,840 A | 4/2000 | Nakanishi |
| 6,057,052 A | 5/2000 | Shrim |
| 6,091,230 A | 7/2000 | Winzer |
| 6,121,752 A | 9/2000 | Kitahara |
| 6,127,061 A | 10/2000 | Shun |
| 6,153,328 A | 11/2000 | Colborn |
| 6,162,555 A | 12/2000 | Gutierrez |
| 6,165,638 A | 12/2000 | Spillman |
| 6,207,037 B1 | 3/2001 | Dartnell |
| 6,211,650 B1 | 4/2001 | Mumaw |
| 6,265,846 B1 | 7/2001 | Flechsig |
| 6,271,646 B1 | 8/2001 | Evers |
| 6,277,508 B1 | 8/2001 | Reiser |
| 6,312,846 B1 | 11/2001 | Marsh |
| 6,355,369 B1 | 3/2002 | Iarochenko |
| 6,379,828 B1 | 4/2002 | Worth |
| 6,383,673 B1 | 5/2002 | Faris |
| 6,383,675 B1 | 5/2002 | Zhong |
| 6,410,174 B1 | 6/2002 | Faris |
| 6,458,480 B1 | 10/2002 | Morris |
| 6,465,638 B2 | 10/2002 | Gorman |
| 6,472,093 B2 | 10/2002 | Faris |
| 6,541,941 B2 | 4/2003 | Adams |
| 6,544,678 B2 | 4/2003 | Faris |
| 6,558,830 B2 | 5/2003 | Faris |
| 6,562,494 B1 | 5/2003 | Tsai |
| 6,562,504 B2 | 5/2003 | Faris |
| 6,566,000 B1 | 5/2003 | Iarochenko |
| 6,569,555 B1 | 5/2003 | Faris |
| 6,579,637 B1 | 6/2003 | Savage |
| 6,586,909 B1 | 7/2003 | Trepka |
| 6,641,943 B1 | 11/2003 | Faris |
| 6,646,418 B1 | 11/2003 | Xie |
| 6,649,294 B2 | 11/2003 | Faris |
| 6,653,252 B2 | 11/2003 | Kawahara |
| 6,673,490 B2 | 1/2004 | Miki |
| 6,677,077 B2 | 1/2004 | Spillman |
| 6,706,433 B2 | 3/2004 | Pinto et al. |
| 6,713,206 B2 | 3/2004 | Markoski |
| 6,756,149 B2 | 6/2004 | Knights |
| 6,762,587 B1 | 7/2004 | Barbetta |
| 6,764,588 B2 | 7/2004 | Smedley |
| 6,787,260 B2 | 9/2004 | Smedley |
| 6,800,397 B2 * | 10/2004 | Okada ................ 429/231.95 |
| 6,802,946 B2 | 10/2004 | Basol |
| 6,811,903 B2 | 11/2004 | Vartak |
| 6,822,423 B2 | 11/2004 | Yau |
| 6,838,203 B2 | 1/2005 | Zheng |
| 6,855,455 B1 | 2/2005 | Berger |
| 6,858,347 B2 | 2/2005 | Tanigawa |
| 6,866,950 B2 | 3/2005 | Connor |
| 6,902,602 B2 | 6/2005 | Keefer |
| 6,911,274 B1 | 6/2005 | Colborn |
| 6,942,105 B2 | 9/2005 | Smedley |
| 6,967,064 B2 | 11/2005 | Haltiner, Jr. |
| 6,986,964 B2 | 1/2006 | Faris |
| 7,020,355 B2 | 3/2006 | Lahann |
| 7,126,310 B1 | 10/2006 | Barron |
| 7,150,933 B1 | 12/2006 | McLean |
| 7,201,857 B2 | 4/2007 | Ovshinsky |
| 7,226,676 B2 | 6/2007 | Faris |
| 7,238,440 B2 | 7/2007 | Damore |
| 7,252,898 B2 | 8/2007 | Markoski |
| 7,270,906 B2 | 9/2007 | Haltiner, Jr. |
| 7,273,541 B2 | 9/2007 | Choban |
| 7,276,309 B2 | 10/2007 | Smedley |
| 7,279,245 B1 | 10/2007 | Clark |
| 7,291,186 B2 | 11/2007 | Zhang |
| 7,303,835 B2 | 12/2007 | Mathias |
| 7,466,104 B2 | 12/2008 | Wang |
| 7,468,221 B2 | 12/2008 | Lafollette |
| 7,482,081 B2 | 1/2009 | Hong |
| 7,488,547 B1 | 2/2009 | Iacovelli |
| 7,535,199 B2 | 5/2009 | Kimura |
| 7,598,706 B2 | 10/2009 | Koski |
| 7,670,575 B2 | 3/2010 | Jarvinen |
| 7,670,705 B2 | 3/2010 | Ueda |
| 7,670,724 B1 | 3/2010 | Chan |
| 7,722,988 B2 | 5/2010 | Webber |
| 8,058,165 B2 | 11/2011 | Kawano |
| 2001/0007725 A1 | 7/2001 | Faris |
| 2002/0015871 A1 | 2/2002 | Tao |
| 2002/0028372 A1 | 3/2002 | Ohlsen |
| 2002/0045075 A1 | 4/2002 | Pinto |
| 2002/0076602 A1 | 6/2002 | Finkelshtain |
| 2002/0098398 A1 | 7/2002 | Chen |
| 2002/0142203 A1 | 10/2002 | Ma |
| 2002/0146600 A1 | 10/2002 | Vartak |
| 2003/0054217 A1 | 3/2003 | Faris |
| 2003/0077501 A1 | 4/2003 | Knights |
| 2003/0099882 A1 | 5/2003 | Hampden-Smith |
| 2003/0134163 A1 | 7/2003 | Markoski |
| 2003/0143446 A1 | 7/2003 | Faris |
| 2003/0165727 A1 | 9/2003 | Priestnall |
| 2003/0190504 A1 | 10/2003 | Fisher |
| 2003/0198862 A1 | 10/2003 | Struthers |
| 2004/0005488 A1 | 1/2004 | Faris |
| 2004/0023112 A1 | 2/2004 | Lin |
| 2004/0053132 A1 | 3/2004 | Smedley |
| 2004/0058203 A1 | 3/2004 | Priestnall |
| 2004/0058217 A1 | 3/2004 | Ohlsen |
| 2004/0058226 A1 | 3/2004 | Lamarre |

(56) References Cited

U.S. PATENT DOCUMENTS

| | | |
|---|---|---|
| 2004/0121208 A1 | 6/2004 | James |
| 2004/0146764 A1 | 7/2004 | Tsai |
| 2004/0157092 A1 | 8/2004 | Kimberg |
| 2004/0157101 A1 | 8/2004 | Smedley |
| 2004/0175603 A1 | 9/2004 | Yang |
| 2004/0180246 A1 | 9/2004 | Smedley |
| 2004/0185323 A1 | 9/2004 | Fowler |
| 2004/0185328 A1 | 9/2004 | Lin |
| 2004/0225249 A1 | 11/2004 | Leonard |
| 2004/0229107 A1 | 11/2004 | Smedley |
| 2004/0247969 A1 | 12/2004 | Faris |
| 2005/0019634 A1 | 1/2005 | Legg |
| 2005/0019651 A1 | 1/2005 | Tsai |
| 2005/0031911 A1 | 2/2005 | Venkatesan |
| 2005/0084737 A1 | 4/2005 | Wine |
| 2005/0123815 A1 | 6/2005 | Tsai |
| 2005/0170245 A1 | 8/2005 | Vartak |
| 2005/0196656 A1 | 9/2005 | Gomez |
| 2005/0208343 A1 | 9/2005 | Kim |
| 2005/0233191 A1 | 10/2005 | Ushio |
| 2006/0003217 A1 | 1/2006 | Cohen |
| 2006/0024551 A1 | 2/2006 | Smotkin |
| 2006/0038536 A1 | 2/2006 | Lafollette |
| 2006/0076295 A1 | 4/2006 | Leonard |
| 2006/0127731 A1 | 6/2006 | Faris |
| 2006/0210867 A1 | 9/2006 | Kenis |
| 2006/0228622 A1 | 10/2006 | Cohen |
| 2006/0234855 A1 | 10/2006 | Gorte |
| 2006/0269826 A1 | 11/2006 | Katz |
| 2006/0292407 A1 | 12/2006 | Gervasio |
| 2007/0020496 A1 | 1/2007 | Pelton |
| 2007/0048577 A1 | 3/2007 | Ringeisen |
| 2007/0077491 A1 | 4/2007 | Burchardt |
| 2007/0092787 A1 | 4/2007 | WangChen |
| 2007/0120091 A1 | 5/2007 | Ovshinsky |
| 2007/0141415 A1 | 6/2007 | Yang |
| 2007/0141430 A1 | 6/2007 | Huang |
| 2007/0141432 A1 | 6/2007 | Wang |
| 2007/0141440 A1 | 6/2007 | Yang |
| 2007/0141450 A1 | 6/2007 | Yang |
| 2007/0154766 A1 | 7/2007 | Baik |
| 2007/0166602 A1 | 7/2007 | Burchardt |
| 2007/0184314 A1 | 8/2007 | Kagami |
| 2007/0224500 A1 | 9/2007 | White |
| 2007/0234900 A1 | 10/2007 | Soloveichik |
| 2007/0237993 A1 | 10/2007 | Carlsson |
| 2007/0248845 A1 | 10/2007 | Armstrong |
| 2007/0248868 A1 | 10/2007 | Haltiner |
| 2007/0259234 A1 | 11/2007 | Chua |
| 2007/0264550 A1 | 11/2007 | Zhang |
| 2007/0269695 A1 | 11/2007 | Yamazaki |
| 2007/0278107 A1 | 12/2007 | Barnett |
| 2007/0287034 A1 | 12/2007 | Minteer |
| 2008/0008911 A1 | 1/2008 | Stroock |
| 2008/0009780 A1 | 1/2008 | Leonard |
| 2008/0026265 A1 | 1/2008 | Markoski |
| 2008/0032170 A1 | 2/2008 | Wainright |
| 2008/0044721 A1 | 2/2008 | Heller |
| 2008/0145719 A1 | 6/2008 | Yang |
| 2008/0145721 A1 | 6/2008 | Shapiro |
| 2008/0145737 A1 | 6/2008 | Cai |
| 2008/0154101 A1 | 6/2008 | Jain |
| 2008/0231231 A1 | 9/2008 | Hartzog |
| 2008/0241617 A1 | 10/2008 | Sato |
| 2008/0252257 A1 | 10/2008 | Sufrin-Disler |
| 2008/0268341 A1 | 10/2008 | Zhang |
| 2009/0027006 A1 | 1/2009 | Vezzini |
| 2009/0081488 A1 | 3/2009 | Sato |
| 2009/0117429 A1 | 5/2009 | Zillmer |
| 2009/0167242 A1 | 7/2009 | Naganuma |
| 2009/0230921 A1 | 9/2009 | Hsu |
| 2009/0284229 A1* | 11/2009 | Friesen et al. ............... 320/137 |
| 2009/0286149 A1 | 11/2009 | Ci |
| 2009/0305090 A1 | 12/2009 | Chuang |
| 2010/0062303 A1 | 3/2010 | Bae |
| 2010/0119883 A1 | 5/2010 | Friesen |
| 2010/0119895 A1 | 5/2010 | Friesen |
| 2010/0285375 A1 | 11/2010 | Friesen et al. |
| 2010/0316935 A1 | 12/2010 | Friesen et al. |
| 2011/0039181 A1 | 2/2011 | Friesen et al. |
| 2011/0044528 A1 | 2/2011 | Tsuchiya |
| 2011/0070506 A1 | 3/2011 | Friesen et al. |
| 2011/0086278 A1 | 4/2011 | Friesen et al. |
| 2011/0189551 A1 | 8/2011 | Friesen et al. |
| 2011/0200893 A1 | 8/2011 | Friesen et al. |
| 2011/0250512 A1 | 10/2011 | Friesen et al. |
| 2011/0305959 A1 | 12/2011 | Friesen et al. |
| 2011/0316485 A1 | 12/2011 | Krishnan |
| 2012/0015264 A1 | 1/2012 | Friesen |
| 2012/0068667 A1 | 3/2012 | Friesen |

FOREIGN PATENT DOCUMENTS

| | | |
|---|---|---|
| EP | 0277937 A1 | 8/1988 |
| EP | 0589144 B1 | 9/1996 |
| GB | 1286173 A1 | 8/1972 |
| WO | 8905528 | 6/1989 |
| WO | 2008058165 | 5/2008 |
| WO | 2010065890 A1 | 6/2010 |
| WO | 2011/035176 A1 | 3/2011 |
| WO | 2011/044528 A1 | 4/2011 |
| WO | 2011163553 A1 | 12/2011 |
| WO | 2011012364 A1 | 1/2012 |

OTHER PUBLICATIONS

Chinese Office Action dated Jan. 13, 2012 of Chinese Appl. No. 201120307185.2 (3 pages) with 6 pages of translation.

Cherepy et al., "A Zinc/Air Fuel Cell for Electric Vehicles," IEEE publication, 1999, pp. 11-13.

Cohen et al., "Fabrication and preliminary testing of a planar membraneless microchannel fuel cell," J. Power Sources, 2005,139, 96-105.

Ferrigno et al., "Membraneless Vanadium Redox Fuel Cell Using Laminar Flow," J. Am. Chem. Soc. 2002, 124, pp. 12930-12931.

Jayashree et al., "Air-Breathing Laminar Flow-Based Microfluidic Fuel Cell," J. Am. Chem. Soc., 2005, 127, pp. 16758-16759.

Jorne et al. "Journal of the Electrochemical Society," vol. 134 No. 6, pp. 1399-1402 (Jun. 1987).

Salloum et al., "Sequential flow membraneless microfluidic fuel cell with porous electrodes," Journal of Power Sources 180, 2008, pp. 243-252.

Smedley et al., "A regenerative zinc-air fuel cell," Journal of Power Sources, vol. 165, 2007, pp. 897-904.

Thirsk (Electrochemistry vol. 4 p. 16, Thirsk, ed. The Chemical Society Great Britain Oxford Alden Press 1974).

Int. Prelininary Report on Patentability dated Apr. 1, 2013 of PCT/US11/41748 filed Jun. 24, 2011 (11 pages).

* cited by examiner

ELECTROCHEMICAL CELL WITH STEPPED SCAFFOLD FUEL ANODE

The present application claims priority to U.S. Provisional Appln. Ser. No. 61/358,339, the entirety of which is hereby incorporated herein by reference.

FIELD

The present application relates to an electrochemical cell for generating power, and more particularly a cell using electrodeposited fuel.

BACKGROUND

U.S. Patent Appln. Publication Nos. 2009/0284229 A1 and 2011/0086278 A1 each disclose a metal-air cell with an anode formed of a series of spaced apart permeable electrode bodies. Metal fuel is reduced and electrodeposited on the electrode bodies. One challenge with this type of design is ensuring that the growth does not prematurely short adjacent electrode bodies together, thus cutting short the opportunity for dense growth between the bodies.

The present application endeavors to provide an improved cell configuration, which may be used with cells such as the ones disclosed in the above referenced applications, where the fuel is electrodeposited on the electrode bodies.

SUMMARY

One aspect of the invention provides a method for operating an electrochemical cell. The cell comprises a fuel electrode comprising a series of permeable electrode bodies arranged in spaced apart relation, and an oxidant electrode spaced apart from the fuel electrode. A charging electrode is spaced apart from the fuel electrode. The charging electrode is selected from the group consisting of (a) the oxidant electrode, and (b) a separate charging electrode. That is, the charging electrode may be the oxidant electrode, or it may be a third electrode in the system. An ionically conductive medium communicates ions between the electrodes. The ions may be in free ionic form, or in a molecular or complexed form. The series of permeable electrode bodies comprise a proximal permeable electrode body, proximal to the charging electrode, and a distal permeable electrode body, distal from the charging electrode. Along at least a portion of a peripheral edge of the fuel electrode, an edge of the proximal permeable electrode body is located inward of an edge of the distal permeable electrode body. The method comprises:
  charging the electrochemical cell by:
    i. applying an electrical current between the charging electrode and at least one of the permeable electrode bodies with the charging electrode functioning as an anode and at least one permeable electrode body functioning as a cathode, such that the reducible fuel ions are reduced and electrodeposited as fuel in oxidizable form on at least one permeable electrode body;
    ii. said electrodeposition causing growth of the fuel among the permeable electrode bodies such that the electrodeposited fuel establishes an electrical connection between the permeable electrode bodies; and
    iii. removing the electrical current to discontinue the charging.

Another aspect of the invention provides an electrochemical cell. The cell comprises a fuel electrode comprising a series of permeable electrode bodies arranged in spaced apart relation, and an oxidant electrode spaced apart from the fuel electrode. A charging electrode is spaced apart from the fuel electrode. The charging electrode is selected from the group consisting of (a) the oxidant electrode and (b) a separate charging electrode. An ionically conductive medium aids in transporting ions between the electrodes. The series of permeable electrode bodies comprises a proximal permeable electrode body, proximal to the charging electrode, and a distal permeable electrode body, distal from the charging electrode. Along at least a portion of a peripheral edge of the fuel electrode, an edge of the proximal permeable electrode body is located inward of an edge of the distal permeable electrode body. Additionally, the spaced apart relation of the permeable electrode bodies of the fuel electrode enables an electrical current to be applied between the charging electrode and at least one of the permeable electrode bodies. In such a configuration, the charging electrode would function as an anode and the at least one permeable electrode body would function as a cathode. This would result in the reducible fuel ions being reduced and electrodeposited as fuel in oxidizable form on at least one permeable electrode body (acting as a cathode). Electrodeposition causes growth of the fuel among the permeable electrode bodies so that the electrodeposited fuel establishes an electrical connection between the permeable electrode bodies.

Another aspect of the invention provides a method for operating an electrochemical cell. The cell comprises a fuel electrode comprising a series of permeable electrode bodies arranged in spaced apart relation. An oxidant electrode is spaced apart from the fuel electrode. A charging electrode is also present. An ionically conductive medium communicates the electrodes. Along at least a portion of a peripheral edge of the fuel electrode, the edges of the permeable electrode bodies are arranged in an inwardly stepped configuration in a first direction. The method comprises:
  charging the electrochemical cell by:
    i. applying an electrical current between the charging electrode and at least one of the permeable electrode bodies of the fuel electrode with the charging electrode functioning as an anode and the at least one permeable electrode body functioning as a cathode, such that reducible fuel ions are reduced and electrodeposited as fuel in oxidizable form on the at least one permeable electrode body;
    ii. said electrodeposition causing growth of the fuel among the permeable electrode bodies in the first direction such that the electrodeposited fuel establishes an electrical connection between the permeable electrode bodies; and
    iii. removing the electrical current to discontinue the charging.

Another aspect of the invention relates to an electrochemical cell. The cell comprises a fuel electrode comprising a series of permeable electrode bodies arranged in spaced apart relation. An oxidant electrode is spaced apart from the fuel electrode. A charging electrode is present. An ionically conductive medium communicates the electrodes. Along at least a portion of a peripheral edge of the fuel electrode, the edges of the permeable electrode bodies are arranged in an inwardly stepped configuration in a first direction. The spaced apart relation of the permeable electrode bodies of the fuel electrode enables an electrical current to be applied between the charging electrode and at least one of the permeable electrode bodies of the fuel electrode with the charging electrode functioning as an anode and the at least one permeable electrode body functioning as a cathode, such that reducible fuel ions are reduced and electrodeposited as fuel in oxidizable form on the at least one permeable electrode body, whereby the electrodeposition causes growth of the fuel among the permeable electrode bodies in the first direction such that the electrodeposited fuel establishes an electrical connection between the permeable electrode bodies.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

The principles of the present invention may be broadly applied to any electrochemical cell where a fuel, such as a metal fuel, is electrodeposited on the anode. Such cells may include batteries, such as metal—air batteries, for example. The Figures illustrate embodiments of various aspects of the inventions claimed. These embodiments are in no way intended to be limiting, and are intended only as examples for facilitating an understanding of the principles of the claimed inventions.

For example an electrochemical cell 10 with which the principles of the present invention may be used may have any construction or configuration, and the examples described herein are not intended to be limiting. For example, the cell 10 may be constructed in accordance with any one of the following patent applications, the entirety of each of which is incorporated herein by reference: Ser. No. 12/385,217 (US Patent Appln. Publication No. 2011/0039181A1), Ser. No. 12/385,489 (U.S. Patent Appln. Publication No. 2009/0284229A1), Ser. No. 12/631,484 (U.S. Patent Appln. Publication No. 2010/0316935A1), Ser. No. 12/549,617 (U.S. Patent Appln. Publication No. 2010/0119895A1), Ser. No. 12/776,962 (U.S. Patent Appln. Publication No. 2010/0285375A1), Ser. No. 12/885,268 (U.S. Patent Appln. Publication No. 2011/0070506A1), Ser. Nos. 13/019,923, 12/901,410 (U.S. Patent Appln. Publication No. 2011/0086278A1), Ser. Nos. 13/083, 929, 13/028,496, 13/085,714, 61/334,047, 61/365,645, 61/378,021, 61/439,759 61/394,954, and 61/383,510. The illustrated embodiments show the applicability of the present invention to an electrochemical cell 10 having a configuration similar to that found in Ser. No. 12/901,410, however this is not to be considered limiting in any way.

Figure 1:
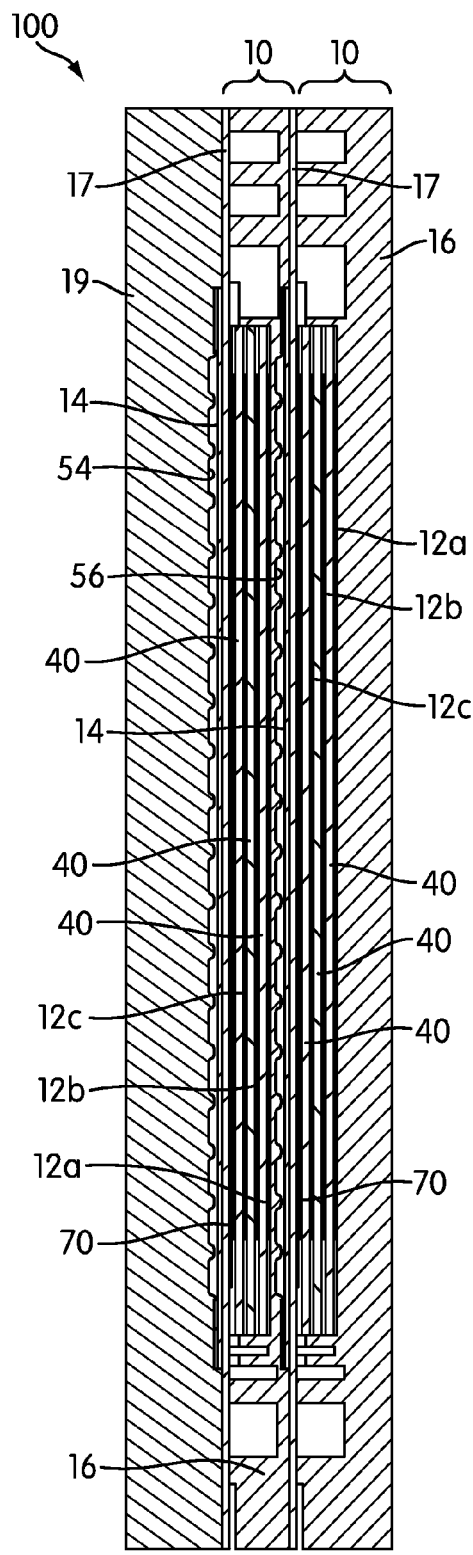
FIG. 1 illustrates a cross-sectional view of an electrochemical cell system that includes two electrochemical cells.
Figure 2:
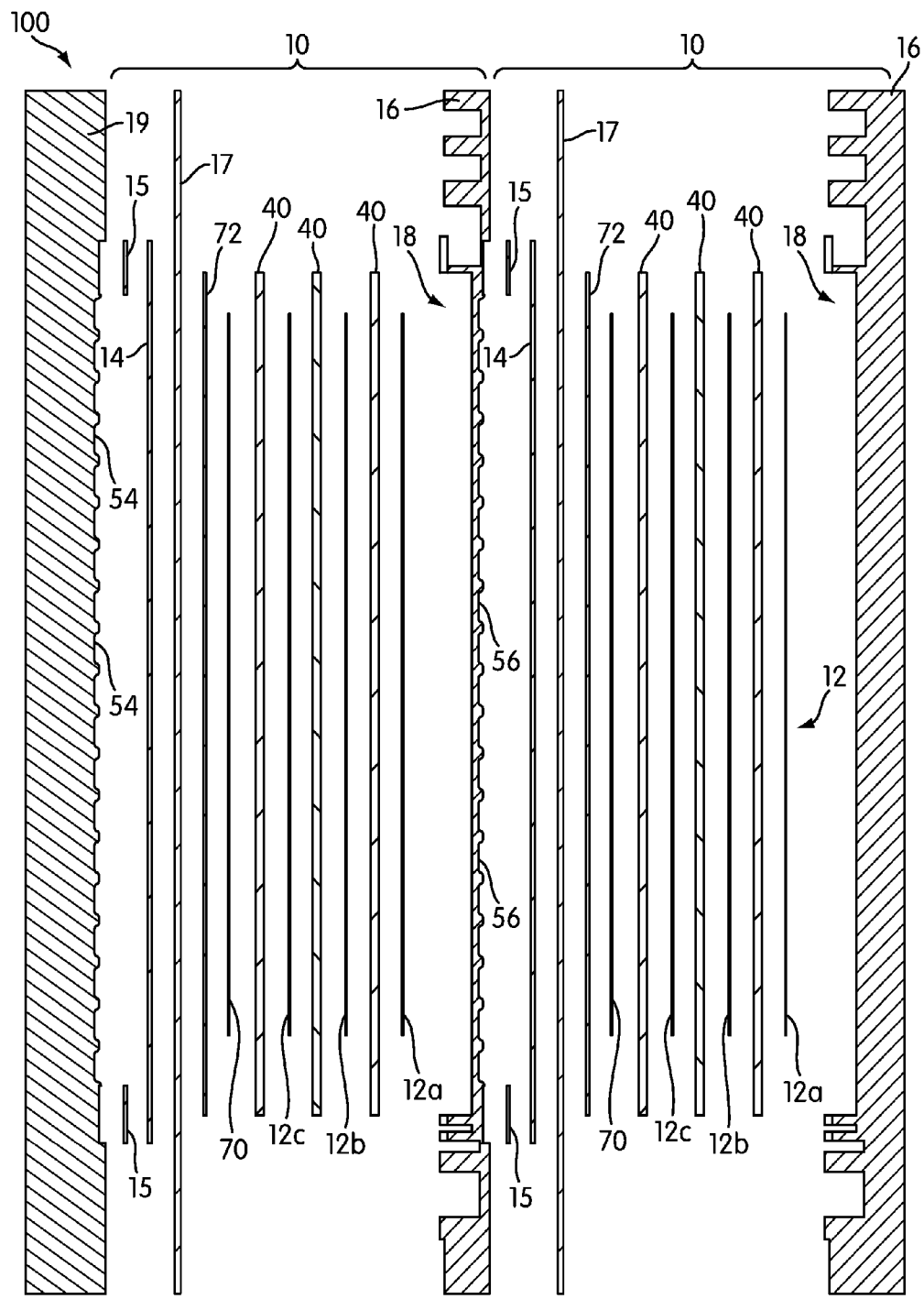
FIG. 2 illustrates an exploded view of the electrochemical cell system of FIG. 1.

FIGS. 1 and 2 illustrate an electrochemical cell system 100 that includes two electrochemical cells 10 according to an embodiment of the invention. As illustrated, each cell 10 includes a fuel electrode 12 and an oxidant electrode 14 that is spaced from the fuel electrode 12 (i.e. first and second electrodes respectively). The fuel electrode 12 is supported by an electrode holder 16. The electrochemical system 100 also includes a cover 19 that is used to cover the electrochemical cells 10 on one side of the system 100, while one of the electrode holders 16 is used to cover the opposite side of the system 100, as illustrated in FIG. 1.

In an embodiment, the fuel electrode 12 is a metal fuel electrode that functions as an anode when the cell 10 operates in discharge, or electricity generating, mode, as discussed in further detail below. In an embodiment, the fuel electrode 12 may comprise a permeable electrode body 12a, such as a screen that is made of any formation able to capture and retain, through electrodepositing, or otherwise, particles or ions of metal fuel from an ionically conductive medium present within the cell 10, as discussed in further detail below. In various embodiments, the fuel electrode 12 may comprise carbon fiber, brass, bronze, stainless steel, nickel, monel, any other high conductivity material, or any other material.

The fuel may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic, molecular (including metal hydrides), or alloy form when collected on the electrode body. However, the present invention is not intended to be limited to any specific fuel, and others may be used. The fuel may be provided to the cell 10 as particles suspended in the ionically conductive medium.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. In an embodiment, the ionically conductive medium may comprise an electrolyte. The medium may also use a non-aqueous solvent or an ionic liquid. In the non-limiting embodiment described herein, the medium is aqueous potassium hydroxide.

The fuel may be oxidized at the fuel electrode 12 when the fuel electrode 12 is operating as an anode, and an oxidizer, such as oxygen, may be reduced at the oxidant electrode 14 when the oxidant electrode 14 is operating as a cathode, which is when the cell 10 is connected to a load and the cell 10 is in discharge or electricity generation mode, as discussed in further detail below. The reactions that occur during discharge mode generate by-product precipitates, e.g., a reducible fuel species, in the ionically conductive medium. For example, in embodiments where the fuel is zinc, zinc oxide is generated as a by-product precipitate/reducible fuel species. During a recharge mode, which is discussed in further detail below, the by-product precipitates, e.g., zinc oxide, may be reversibly reduced and deposited as the fuel, e.g., zinc, onto the fuel electrode 12, which functions as a cathode during recharge mode. During recharge mode, either the oxidant electrode 14, a separate charging electrode 70 (i.e. a third electrode), described below, or a body of the fuel electrode itself, also described below, functions as the anode. The switching between discharge and recharge modes is discussed in further detail below.

Figure 3:
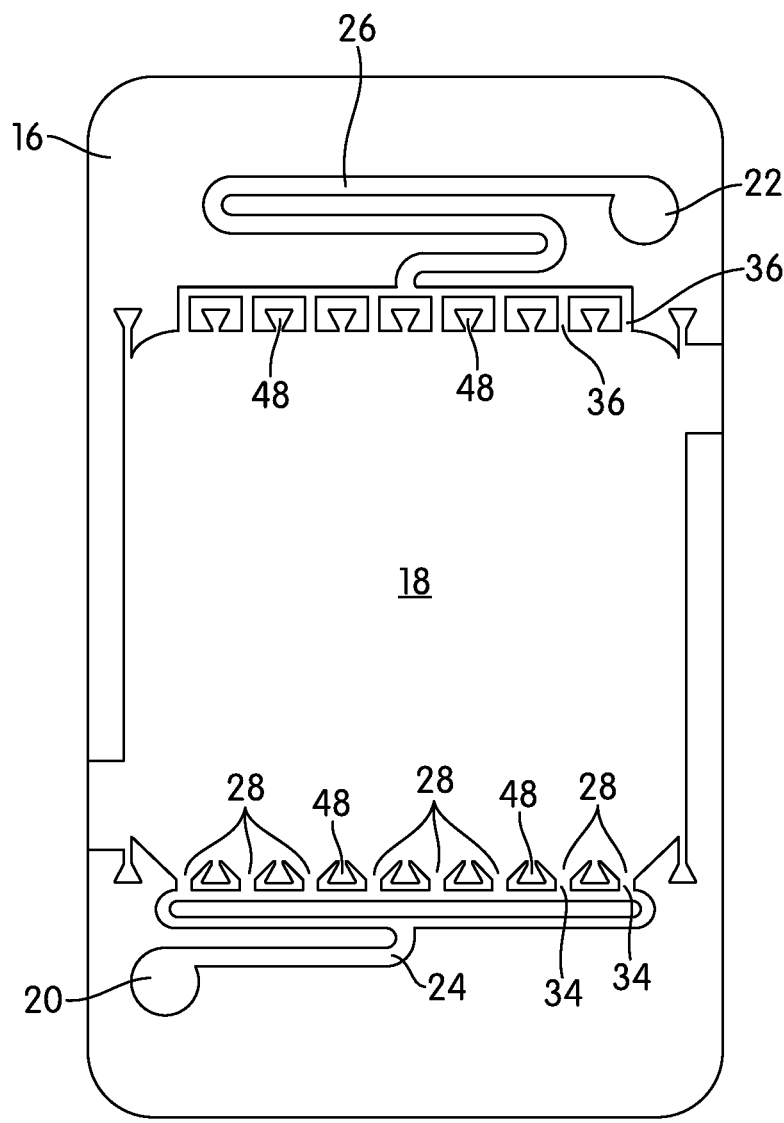
FIG. 3 illustrates an electrode holder of one of the electrochemical cells of FIG. 1.

The electrode holder 16 defines a cavity 18 in which the fuel electrode 12 is held. The electrode holder 16 also defines an inlet 20 and an outlet 22 for the cell 10. The inlet 20 is configured to allow the ionically conductive medium to enter the cell 10 and/or recirculate through the cell 10. The inlet 20 may be connected to the cavity 18 via an inlet channel 24, and the outlet 22 may be connected to the cavity 18 via an outlet channel 26. As illustrated in FIG. 3, the inlet channel 24 and the outlet channel 26 may each provide a meandering tortuous path through which the ionically conductive medium may flow. The meandering path defined by the inlet channel 24 preferably does not include any sharp corners in which the flow of the medium may become stagnated or in which any particulates in the medium may collect. As discussed in further detail below, the length of the channels 24, 26 may be designed to provide an increased ionic resistance between cells that are fluidly connected in series. Any construction or configuration may be used, and the disclosed embodiment is not limiting.

For each cell 10, a permeable seal member 17 may be bonded between sealing surfaces on the electrode holders 16 and/or the cover 19, as appropriate, to enclose at least the fuel electrode 12 in the cavity 18. The seal member 17 also covers the inlet and outlet channels 24, 26. The seal member 17 is non-conductive and electrochemically inert, and is preferably designed to be permeable to the ionically conductive medium in the orthogonal direction (i.e., through its thickness), without permitting lateral transport of the ionically conductive medium. This enables the ionically conductive medium to permeate through the seal member 17 for enabling ion conductivity with the oxidant electrode 14 on the opposing side to support the electrochemical reactions, without "wicking" the ionically conductive medium laterally outwardly from the cell 10. A few non-limiting examples of a suitable material for the seal member 17 are EPDM and TEFLON®.

In the illustrated embodiment, the cavity 18 has a generally rectangular, or square, cross-section that substantially matches the shape of the fuel electrode 12. One side of the cavity 18, specifically, the side of the cavity 18 that is connected to the inlet channel 24, includes a plurality of fluidization zones 28 that are each connected to the inlet channel 24 via a manifold that includes a plurality of cavity inlets 34 so that when the ionically conductive medium and precipitates or reducible fuel species enter the cavity 18, the ionically conductive medium and fuel enter the fluidization zones 28. As shown in greater detail in FIG. 7, each fluidization zone 28 is partially defined by two surfaces 30, 32 that are angled with respect to each other but do not touch each other so as to define diverging surfaces with respect to an axis that extends from the inlet 34 through the center of the fluidization zone 28. In the illustrated embodiment, the surfaces 30, 32 substantially define a "V" with an open bottom that is open to the inlet 34, as illustrated in FIG. 3. Although the illustrated embodiment shows the surfaces 30, 32 as being relatively straight, the surfaces may be curved or partially curved, so long as the surfaces 30, 32 are diverging from the inlet 34.

Figure 7:
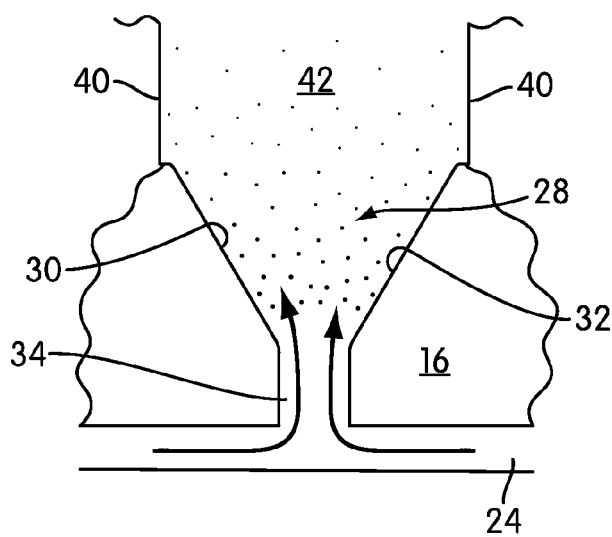
FIG. 7 illustrates a fluidization zone defined in part by the electrode holder of FIG. 3 in greater detail.

The fluidization zones 28 are configured so that as the ionically conductive medium with particulates flows into the cavity 18 via the inlet channel 24, the particulates are fluidized in the ionically conductive medium, which allows for the particulates to be more evenly dispersed in the ionically conductive medium as the ionically conductive medium contacts the fuel electrode 12. This is particularly advantageous when the electrochemical cell 10 is oriented with the open bottom of the V-shaped fluidization zones 28 is pointed downward, as illustrated in FIG. 7. This is because gravity will tend to cause the particulates to accumulate at the inlet end of the cavity 18 between the inlet channel 24 and the outlet channel 26. By fluidizing the particulates in the ionically conductive medium, and by providing a pressure drop across the cavity 18, as discussed in further detail below, the particulates will flow more evenly across the cavity 18, with substantially less or no accumulation at the inlet end of the cavity 18. This may improve the efficiency of the cell 10 by providing a more even distribution of the particulates across the surface of the fuel electrode 12.

Figure 4:
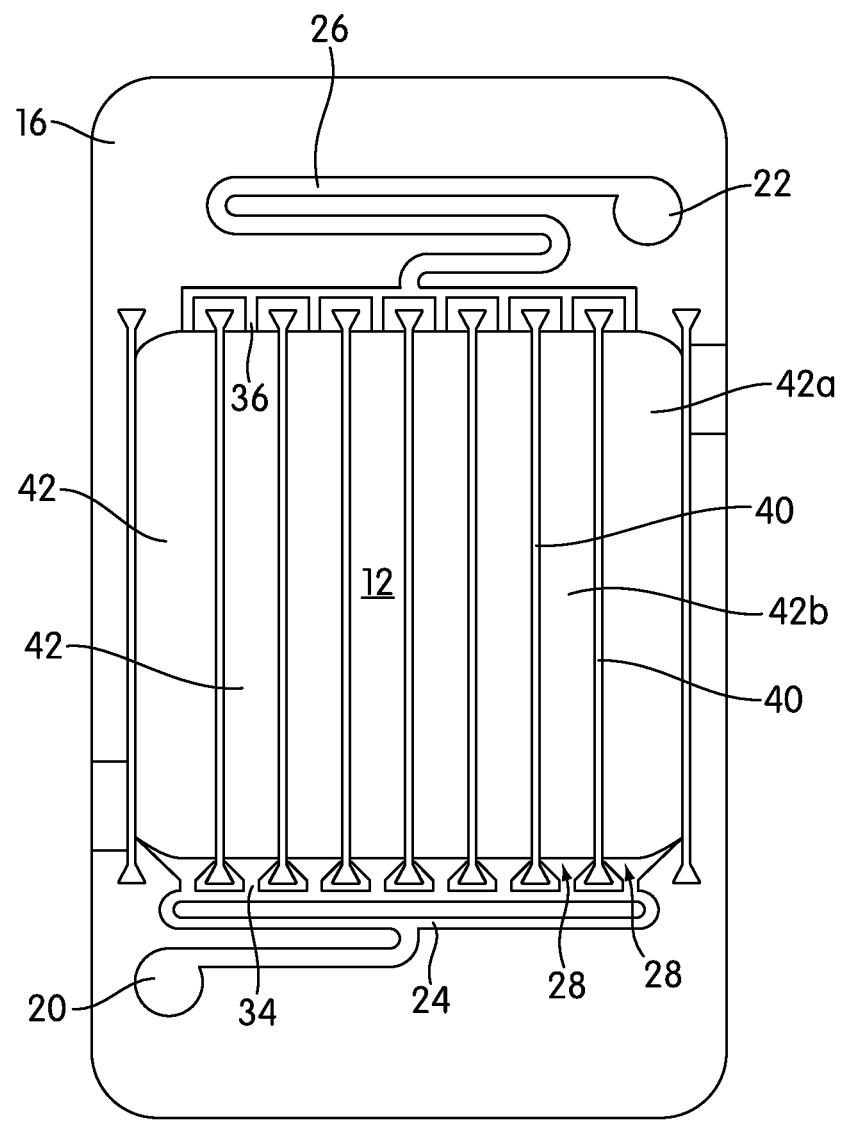
FIG. 4 illustrates the electrode holder of FIG. 3 holding a fuel electrode and a plurality of spacers connected to the electrode holder.

As illustrated in FIG. 4, a plurality of spacers 40, each of which extends across the fuel electrode 12 in a spaced relation to each other, are connected to the electrode holder 16 so that the fuel electrode 12 may be held in place relative to the electrode holder 16 and to the oxidant electrode 14. In an embodiment, the fuel electrode 12 may contain a plurality of permeable electrode bodies 12a-12c, as illustrated in FIG. 2, that may be separated by sets of the plurality of spacers 40, so that each set of spacers 40 is positioned in between adjacent electrode bodies to electrically isolate the electrode bodies 12a-12c from each other. Within each set of spacers 40 between adjacent electrode bodies, the spacers 40 are positioned in a spaced relation in a manner that creates so-called "flow lanes" 42 therebetween, as discussed in greater detail below. The flow lanes 42 are three-dimensional and have a height that is substantially equal to the height of the spacers 40. In an embodiment, the spacers may be provided by a single frame that has cut-outs corresponding to the flow lanes. In an embodiment, the flow lanes may include a foam or honeycomb-type structure that is configured to allow the ionically conductive medium to flow therethrough. In an embodiment, the flow lanes may include an array of pins that are configured to disrupt the flow of the ionically conductive medium through the flow lanes. The illustrated embodiment is not intended to be limiting in any way.

The spacers 40 are non-conductive and electrochemically inert so they are inactive with regard to the electrochemical reactions in the cell 10. The spacers 40 are preferably sized so that when they are connected to the electrode holder 16, the spacers 40 are in tension, which allows the spacers 40 to press against the fuel electrode 12, or one of the electrode bodies 12a-12c, so as to hold the fuel electrode 12 or bodies thereof in a flat relation relative to the electrode holder 16. The spacers 40 may be made from a plastic material, such as polypropylene, polyethylene, noryl, fluoropolymer, etc. that allows the spacers 40 to be connected to the electrode holder 16 in tension.

Figure 5:
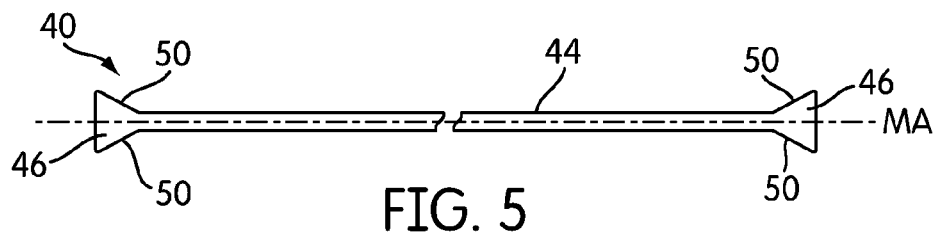
FIG. 5 illustrates one of the spacers of FIG. 4 in greater detail.
Figure 6:
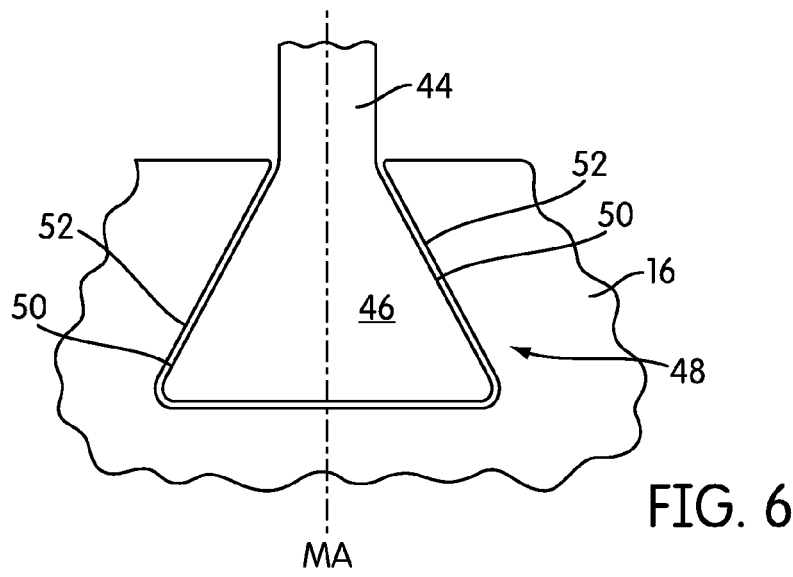
FIG. 6 illustrates a connection between the spacer of FIG. 5 and the electrode holder of FIG. 3 in greater detail.

In the embodiment illustrated in FIG. 5, each spacer has an elongated middle portion 44, and a shaped connecting portion 46 at each end. The shaped connecting portions 46 are configured to be held by openings 48 having substantially similar shapes in the electrode holder 16, as illustrated in FIG. 6. In the illustrated embodiment, the shaped portions 46 and the openings 48 have a substantially triangular shape, although the illustrated shape is not intended to be limiting in any way. The substantially triangular shape provides surfaces 50 on opposite sides of the elongated portion 44 of the spacer 40 that are configured to contact corresponding surfaces 52 on the electrode holder 16. Because the surfaces 50, 52 are angled with respect to a major axis MA of the elongated portion 44 of the spacer 40 and the tension in the spacer 40 will be along the major axis MA, the forces created by the tension may be distributed across a larger surface, as compared to a shaped portion having a circular or square shape with the same area.

Once the spacers 40 have been connected to the electrode holder 16 via the end portions 46, the flow lanes 42 are defined across the cavity 18 of the electrode holder 16. The spacers 40 are configured to essentially seal off one flow lane 42a from an adjacent flow lane 42b, that is separated by one of the spacers 40 so that the ionically conductive medium is guided to generally flow in substantially one direction. Specifically, the ionically conductive medium may generally flow in a first direction FD across the fuel electrode 12, from the inlet channel 24 to the outlet channel 26. A suitable pressure drop is generated between the inlet channel 24 and the fluidization zones 28 so that the ionically conductive medium may flow across the cavity 18 and to the outlet channel 26, even when the cell 10 is oriented such that the flow is substantially upward and against gravity. In an embodiment, the ionically conductive medium may also permeate through the fuel electrode 12, or an individual permeable electrode body 12a-12c, in a second direction SD and into a flow lane that is on the opposite side of the fuel electrode 12 or permeable electrode body 12a-12c.

Again, the illustrated embodiment is not limiting and merely shows a working example for reference. The fuel electrode configuration discussed herein may be used with any cell configuration.

In an embodiment, the fuel electrode 12 is connected to an external load so that electrons given off by the fuel as the fuel is oxidized at the fuel electrode 12 flow to the external load. The oxidant electrode 14 functions as a cathode when the oxidant electrode 14 is connected to the external load and the cell 10 operates in discharge mode. When functioning as a cathode, the oxidant electrode 14 is configured to receive electrons from the external load and reduce an oxidizer that contacts the oxidant electrode 14. In an embodiment, the oxidant electrode 14 comprises an air breathing electrode and the oxidizer comprises oxygen in the surrounding air.

The oxidizer may be delivered to the oxidant electrode 14 by a passive transport system. For example, where oxygen present in ambient air is the oxidizer, simply exposing the oxidant electrode 14 to ambient air via openings in the cell, such as the openings that are provided by grooves 54 in the cover 19 and grooves 56 in the electrode holder 16 provided in the center of the electrochemical cell system 100, may be sufficient to allow diffusion/permeation of oxygen into the oxidant electrode 14. Other suitable oxidizers may be used and embodiments described herein are not limited to the use of oxygen as the oxidizer. A peripheral gasket 15 may be positioned between the periphery of the oxidant electrode 14 and the cover 19 or electrode holder 16, as appropriate, to prevent the ionically conductive medium from leaking around the oxidant electrode 14 and into the area in the grooves 54, 56 for air exposure.

In other embodiments, a pump, such as an air blower, may be used to deliver the oxidizer to the oxidant electrode 14 under pressure. The oxidizer source may be a contained source of oxidizer. Likewise, when the oxidizer is oxygen from ambient air, the oxidizer source may be broadly regarded as the delivery mechanism, whether it be passive or active (e.g., pumps, blowers, etc.), by which the air is permitted to flow to the oxidant electrode 14. Thus, the term "oxidizer source" is intended to encompass both contained oxidizers and/or arrangements for passively or actively delivering oxygen from ambient air to the oxidant electrode 14.

Electricity that can be drawn by the external load is generated when the oxidizer at the oxidant electrode 14 is reduced, while the fuel at the fuel electrode 12 is oxidized to an oxidized form. The electrical potential of the cell 10 is depleted once the fuel at the fuel electrode 12 is entirely oxidized or oxidation is arrested due to passivation of the fuel electrode. A switch may be positioned in between the oxidant electrode 14 and the load so that the oxidant electrode 14 may be connected and disconnected from the load, as desired.

To limit or suppress hydrogen evolution at the fuel electrode 12 during discharge mode and during quiescent (open circuit) periods of time, salts may be added to retard such a reaction. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution.

After the fuel in the cell 10 has been entirely oxidized, or whenever it is desirable to regenerate the fuel within the cell 10 by reducing the oxidized fuel ions back to fuel, the fuel electrode 12 and the oxidant electrode 14 may be decoupled from the external load, and the fuel electrode is a charging electrode (which may be the oxidant electrode in same embodiments) are coupled to a power supply with the use of suitable switches. The power supply is configured to charge the cell 10 by applying a potential difference between the fuel electrode 12 and the charging electrode such that the reducible species of the fuel is reduced and electrodeposited onto the permeable electrode bodies 12a-12c and the corresponding oxidation reaction takes place at the charging electrode, which is typically oxidation of an oxidizable species to evolve oxygen, which may be off-gassed from the cell 10. As described in detail in U.S. patent application Ser. No. 12/385, 489, filed on Apr. 9, 2009 and incorporated herein by reference, only one of the permeable electrode bodies, such as 12a, may be connected to the power supply so that the fuel reduces onto the permeable electrode body and progressively grows to and on the other permeable electrode bodies 12b-12c, one by one. The switches may control when the cell 10 operates in discharge mode and in charge mode, as is described in greater detail below.

Any suitable control mechanism may be provided to control the action of the switches between the open and closed positions. For example, a relay switch that is biased toward the open position may be used, with an inductive coil coupled to the power supply that causes closure of the switch when charging begins. Solid state switches may be used as well. Further, a more complex switch that allows for individual connection to the permeable electrode bodies 12a-12c could be used to provide the connection/disconnection to and from the load, and to and from each other.

Returning to FIG. 4, after the ionically conductive medium has passed through the fuel electrode 12, the medium may flow into the outlet channel 26 that is connected to the outlets 36 of the cavity 18 of the electrode holder 16 and the outlet 22. The outlet 22 may be connected to the inlet 20 in embodiments where the medium is recirculated in the cell 10, or to an inlet of an adjacent cell, as discussed in further detail below, when a plurality of cells 10 are fluidly connected in series. In an embodiment, the outlet 22 may be connected to a vessel to collect the medium that has been used in the cell 10.

The cells 10 illustrated in FIGS. 1 and 2 may be fluidly connected in series. Details of embodiments of cells that are connected in series are provided in U.S. patent application Ser. No. 12/631,484, filed Dec. 4, 2009 and incorporated herein by reference in its entirety. The outlet 22 of a first cell 10 may be fluidly connected to the inlet 20 of a second cell 10, and the outlet 22 of the second cell 10 may be connected to the inlet 20 of a third cell, and so on. Although the embodiment of FIGS. 1 and 2 illustrates two cells 10, additional cells may be stacked and fluidly connected to the illustrated cells. Due to the meandering, tortuous paths that are created by the inlet channel 24 and the outlet channel 26, described above and illustrated in FIGS. 3 and 4, the length of the flow passageways for the medium via the channels 24, 26 is greater than the distance between the fuel electrode 12 and the oxidant electrode 14 in each of the cells 10. This creates an ionic resistance between the pair of fluidly connected cells that is greater than an ionic resistance within an individual cell 10. This may reduce or minimize internal ionic resistance loss of the stack of cells 100, as discussed in U.S. patent application Ser. No. 12/631,484.

The cells may also be fluidly connected in parallel or series by disperser chambers design to eliminate or reduce shunt currents, such as is disclosed in U.S. Patent Appln. Ser. No. 61/439,759, incorporated herein by reference. In operation, the fuel electrode 12, which already has metal fuel deposited thereon, is connected to the load and the oxidant electrode 14 is connected to the load. The ionically conductive medium enters the inlet 20 under positive pressure and flows through the inlet channel 24, the inlets 34 of the cavity 18, and into the fluidization zones 28 of the flow lanes 42. The ionically conductive medium flows across the permeable electrode bodies 12a-12c in the flow lanes 42 defined by the elongated middle portions 22 of the spacers 40. The ionically conductive medium may also permeate through the permeable electrode bodies 12a-12c of the fuel electrode 12. The ionically conductive medium simultaneously contacts the fuel electrode 12 and the oxidant electrode 14, thereby allowing the fuel to oxidize and conduct electrons to the load, while the oxidizer is reduced at the oxidant electrode 14 via the electrons that are conducted to the oxidant electrode 14 by the load. After the ionically conductive medium has passed through the flow lanes 42, the medium flows out of the cavity 18 via the outlets 36 of the cavity 18, through the outlet channel 24, and out the outlet 22 of the cell 10.

When the potential of the cell 10 has been depleted or when it is otherwise desirable to recharge the cell 10, the fuel electrode 12 is connected to the negative terminal of the power supply and the charging electrode, which may be the oxidant electrode 14, the separate charging electrode 70, or a body of the fuel electrode 12 itself is connected to the positive terminal of the power supply. In the charging or recharge mode, the fuel electrode 12 becomes the cathode and the charging electrode 14, 70 becomes the anode. By providing electrons to the fuel electrode 12, fuel ions may reduce into fuel and redeposit onto the permeable electrode bodies 12a-12c, as is described in greater detail below, while the ionically conductive medium circulates through the cell 10 in the same manner as described above with respect to the discharge mode.

The optional flow lanes 42 provide directionality and distribution of the ionically conductive medium across the fuel electrode 12. The optional fluidization zones 28 agitate the particulates and precipitates that have been formed during discharge mode of the cell 10 within the ionically conductive medium and prevent the particulates from settling out of the medium at the bottom of the cavity, which allows the particulates to flow with the ionically conductive medium across the fuel electrode 12. The flow lanes 42 may also prevent the particulates from settling and/or covering the electrodes. When the cell 10 is in charging mode, the improved distribution of the particulates across the fuel electrode 12 may allow for a more uniform deposition of the reduced fuel onto the fuel electrode 12, which improves the density of the fuel on the fuel electrode 12, and increases the capacity and energy density of the cell 10, thereby enhancing the cycle-life of the cell 10. In addition, by having the ability to control the distribution of the precipitates or reaction by-product during discharge, early passivation/deposition of the by-product on the fuel electrode 12 may be prevented. Passivation leads to lower fuel utilization and lower cycle life, which is undesirable.

The cell 10 described above is presented herein to provide context for various aspects of the present invention and is not intended to be limiting. Likewise, FIGS. 8-12 and their associated descriptions below are provided as background examples to illustrate in detail the electrodeposition of metal fuel on the fuel electrode 12 in the context of prior configurations of the fuel electrode 12 within the cell 10. Following this description, FIG. 13 depicts inefficiencies that may arise with the cell 10 when the fuel electrode 12 has a similar configuration to those depicted in FIGS. 8-12. FIGS. 14-22 and their associated descriptions, however, present various aspects and embodiments of the present invention that may, among other things, mitigate the inefficiencies depicted in FIG. 13. As in the cell 10 provided for context above, these latter Figures depict a fuel electrode 12 having a series of permeable electrode bodies 12a-c arranged in spaced apart relation along a flow path. Despite the depiction of three permeable electrode bodies 12a-c, any number of permeable electrode bodies may be used. Furthermore, electrodeposition on the fuel electrode 12 as described herein may be found in any type of electrochemical cell, and is not limited to the exemplary type of cell 10 described above. Thus, although electrodeposition is described below with reference to the cell 10, this is not intended to be limiting. Where the same reference numbers are used between Figures, it should be understood that similar structures are being referred to, and it is not necessary to repeat the description of those structures herein.

Figure 8:
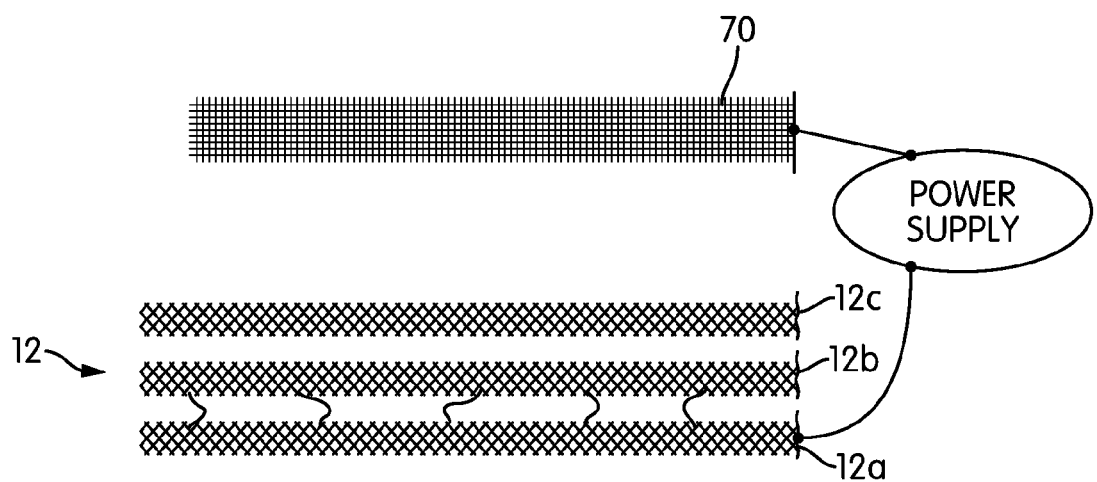
FIG. 8 is an isolated schematic view of an embodiment of an electrochemical cell showing a plurality of electrode bodies and the electrodeposited fuel growth thereon.
Figure 9:
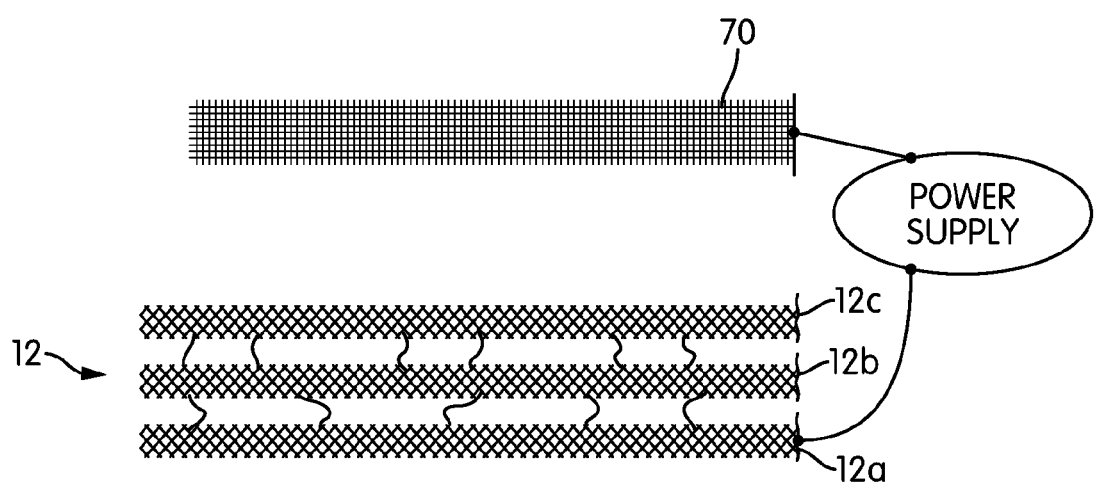
FIG. 9 shows the progression of the growth in FIG. 8.
Figure 10:
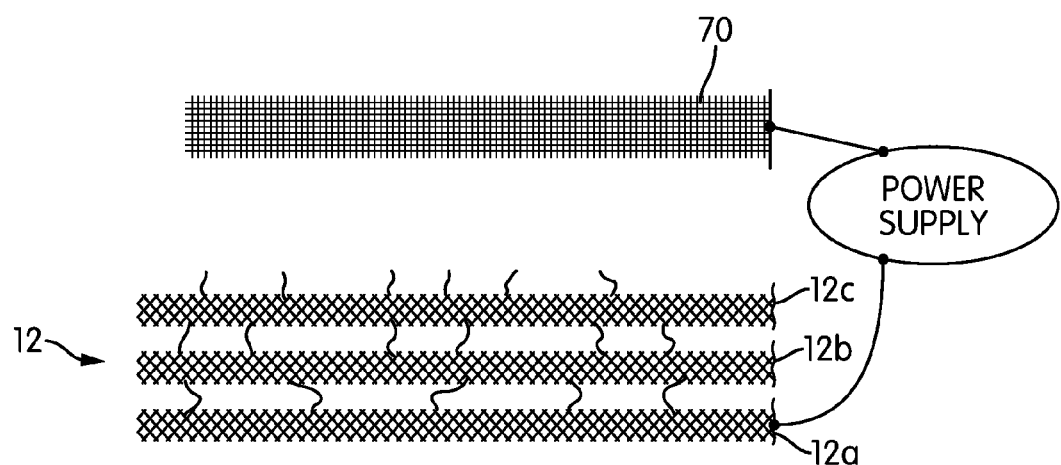
FIG. 10 shows the continued progression of the growth in FIGS. 8 and 9.

FIGS. 8-10 show exaggerated views of an electrode 12 having a configuration similar to that described above. The cell 10 of FIGS. 8-10 include a charging electrode spaced apart from the fuel electrode 12. As shown, the charging electrode may be a separate charging electrode 70 spaced apart from both the fuel electrode 12 and the oxidant electrode 14 described above. In some embodiments, the separate charging electrode 70 may be spaced apart from the fuel electrode 12 on the same side as the oxidant electrode 14, such as by being positioned between the fuel electrode 12 and the oxidant electrode 14. In another embodiment, the fuel electrode 12 may be between the oxidant electrode 14 and the separate charging electrode 70. However, in some embodiments, the oxidant electrode 14 may be used during charging as the charging electrode, and the presence of a separate electrode (i.e. the separate charging electrode 70) dedicated to charging is not necessary. In another embodiment, one or more of the bodies of the fuel electrode 12 may function as the charging electrode, as will be discussed below. In the Figures, the separate charging electrode 70 is used because many electrodes suitable for function as an air breathing cathode do not perform well in the anodic role of a charging electrode. However, the invention is not intended to be limiting, and it is possible to select an oxidant electrode that is bi-functional, meaning that it can perform both the role of an air breathing cathode during current generation and the role of an anodic charging electrode during charging. Thus, any reference herein to a charging electrode may be regarded as applying either to the oxidant electrode 14 or a separate electrode 70 functioning as the anode during charging. More specifically, while the illustrated embodiment is described with reference to the charging electrode as the separate charging electrode 70, it should be understood that the same description could be used where the oxidant electrode 14 is the charging electrode; and it should be readily understood that the flow (if used) may be oriented accordingly.

Charging the electrochemical cell 10 may be performed by flowing the ionically conductive medium comprising reducible metal fuel ions along the flow path along the permeable electrode bodies 12a-c. In another embodiment, the ionically conductive medium may flow through the permeable electrode bodies 12a-c. Any suitable direction of flow may be utilized in the present invention. The reducible fuel ions may be present in the ionically conductive medium in any suitable form, such as in ionic, atomic, molecular or complexed form.

While the ionically conductive medium comprising reducible metal ions is flowing along the permeable electrode bodies 12a-c, an electrical current from an external source, which may be any power source capable of delivering electrical current, is applied between the charging electrode 70 and a terminal one 12a of the permeable electrode bodies 12a-c with the charging electrode functioning as an anode and the terminal permeable electrode body 12a functioning as a cathode. As a result, the reducible metal fuel ions are reduced and electrodeposited as metal fuel in oxidizable form on the terminal permeable electrode body 12a. In the illustrated embodiment, the terminal permeable electrode body 12a is the electrode body distal to the charging electrode 70. While this is preferred in the context of the illustrated embodiment, in other arrangements a different one of the permeable electrode bodies 12a-c may serve as the terminal permeable electrode body, as discussed below.

In a non-limiting embodiment, wherein the fuel is zinc and the ionically conductive medium is potassium hydroxide (KOH), the zinc ions in the ionically conductive medium may be provided in any suitable reducible form, and preferably in the form of zinc oxide (ZnO). This is advantageous, as zinc oxide is the by-product of the current generating operation described above with regard to the prior embodiment, and thus the cell can be re-charged using the reversible by-product of its own current generating operation. This eliminates the need to supply the fuel from a fresh source for each charging, as the current generating operation has already created the reducible zinc oxide in the ionically conductive medium. In such an embodiment, the reduction reaction occurs as follows at the reduction site:

$$ZnO + H_2O + 2e^- \rightarrow Zn + 2OH^- \quad (1)$$

And the corresponding oxidation occurs at the charging electrode 70 functioning as an anode (also referred to as an oxygen evolving electrode) as follows, oxidizing the oxygen species to produce oxygen gas that may optionally be off-gassed in any suitable manner:

$$2OH^- \rightarrow 2e^- + \tfrac{1}{2}O_2 + H_2O \quad (2)$$

However, the fuel need not be limited to zinc, and any other metal fuel, including any of those mentioned above in this application, may also be used. Likewise, the ionically conductive medium may be different, and may be alkaline or acidic in various embodiments. Also, it is not necessary that the reducible fuel ions be provided by the by-product of the current generating operation, and it is within the scope of the invention to use fuels that create by-products that are not readily reversible. Thus, it is within the scope of the invention that the ionically conductive medium used for charging be supplied from a separate fuel source with the fuel ions in a suitable form for reduction and electrodeposition, which fuel source is separate from the ionically conductive medium used during current generation and which accumulates the by-product. Likewise, the same ionically conductive medium could be used in both processes, but the fuel could be provided separately from its own source during re-charging.

During the charging, the electrodeposition causes growth of the metal fuel in a flow permeable morphology among the permeable electrode bodies 12a-12c such that the electrodeposited metal fuel establishes an electrical connection between the terminal permeable body 12a and each subsequent permeable electrode body 12b-c. As a result of this growth, the reduction and the electrodeposition occur on each subsequent permeable electrode body 12b-c upon the establishment of the electrical connection.

By flow permeable morphology, this terms means that the morphology of the metal growth among the electrode bodies 12a-c is configured such that the ionically conductive medium is still able to flow along the electrode bodies 12a-c. Thus, the flow is allowed to continue, and the growth does not exhibit dominant lateral characteristics with respect to the flow direction that would cause complete clogging or blocking between the permeable electrode bodies 12a-c. The growth may have any such configuration, and the flow permitted may be in any direction. It is also possible to have the growth occur without any flow. As such, the growth may grow towards or away or in both directions from the anode depending on the electric field, flow direction, or other electrochemical conditions. In various embodiments, the growth may occur as dense branch morphology, dendritic growth morphologies, or other morphologies known to arise under transport-limited growth conditions. The growth may have sufficient directionality towards the next permeable electrode body, may occur as a generally uniform plating growth, or in any other fashion.

In the illustrated embodiment, the growth exhibited is dendritic, and the growth is in the direction towards the charging electrode 70. The Figures illustrate the growth morphology in an exaggerated format to better understand the basic principles of operation. In a practical execution, the growth will typically be significantly denser throughout the electrode bodies 12a-c.

In FIG. 8, the initial reduction of the fuel ions and electrodeposition of the metal fuel on a prior configuration of the fuel electrode 12 is shown. The dendrites are initially electrodeposited on and begin their growth on the terminal electrode body 12a. This is because electrode body 12a is connected to the external current, and has a cathodic potential that causes the reduction of the fuel ions and electrodeposition of the fuel thereon (while the charging electrode 70 is connected the external load and functions as the anode). In contrast, the remaining electrode bodies 12b-c are initially inactive and do not function as a reduction site because they are not connected to the external current. The growth continues with the metal growing as a series of dendrites from electrode body 12a towards electrode body 12b. This then establishes an electrical connection between electrode bodies 12a and 12b, which in turn causes electrode body 12b to now also have the cathodic potential applied to it.

The growth thereafter continues with the fuel ions being reduced and electrodeposited as metal fuel on electrode body 12b, as shown in FIG. 9. This growth continues with the metal growing as another series of dendrites from electrode body 12b towards electrode body 12c. This then establishes an electrical connection between electrode bodies 12a, 12b and 12c, which in turn causes electrode body 12c to now also have the cathodic potential applied to it.

The growth thereafter continues with the fuel ions being reduced and electrodeposited as metal fuel on electrode body 12c, as shown in FIG. 10. This growth continues with the metal growing as another series of dendrites from electrode body 12c towards the charging electrode (i.e. separate charging electrode 70). Regardless of the number of permeable electrode bodies, the growth pattern will continue throughout the permeable electrode bodies in the fuel electrode 12. Eventually, the growth on the last body 12c may reach to the charging electrode, thus shorting the circuit and indicating completion of the growth.

In embodiments wherein the flow is parallel to the electrode bodies 12a-c, or wherein there is no flow, it would be preferable for the terminal electrode body to be the one distal from the charging electrode (i.e., the electrode functioning as the anode during re-charging) so that the growth towards the charging electrode progresses through the multiple electrode bodies 12a-12c by its natural tendency to grow towards the anodic potential. In other embodiments, wherein the flow passes through the electrode bodies 12a-c, it may be preferable to alter the location of the terminal electrode body so that the flow grows alternatively towards or away from the charging electrode.

Figure 11:
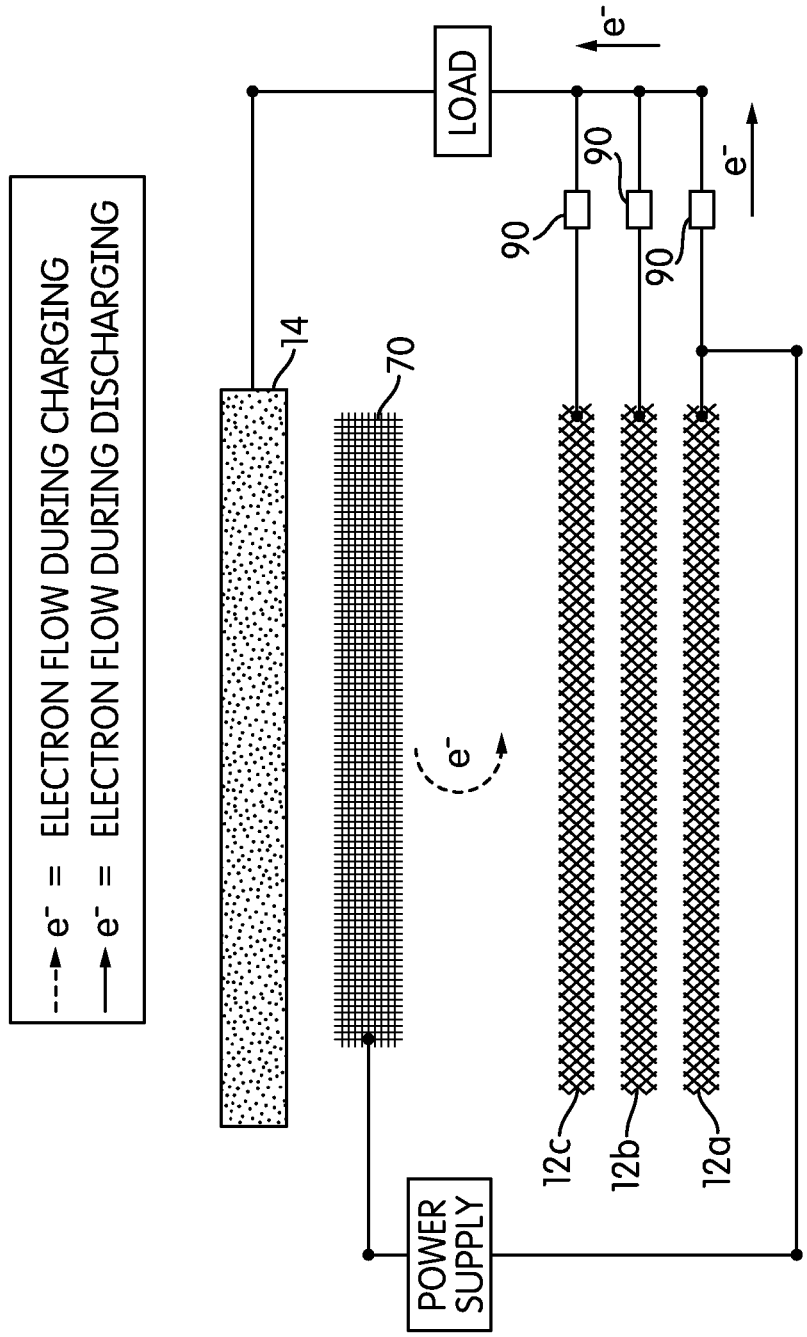
FIG. 11 is a schematic view similar to FIG. 8, but showing an alternative embodiment.
Figure 12:
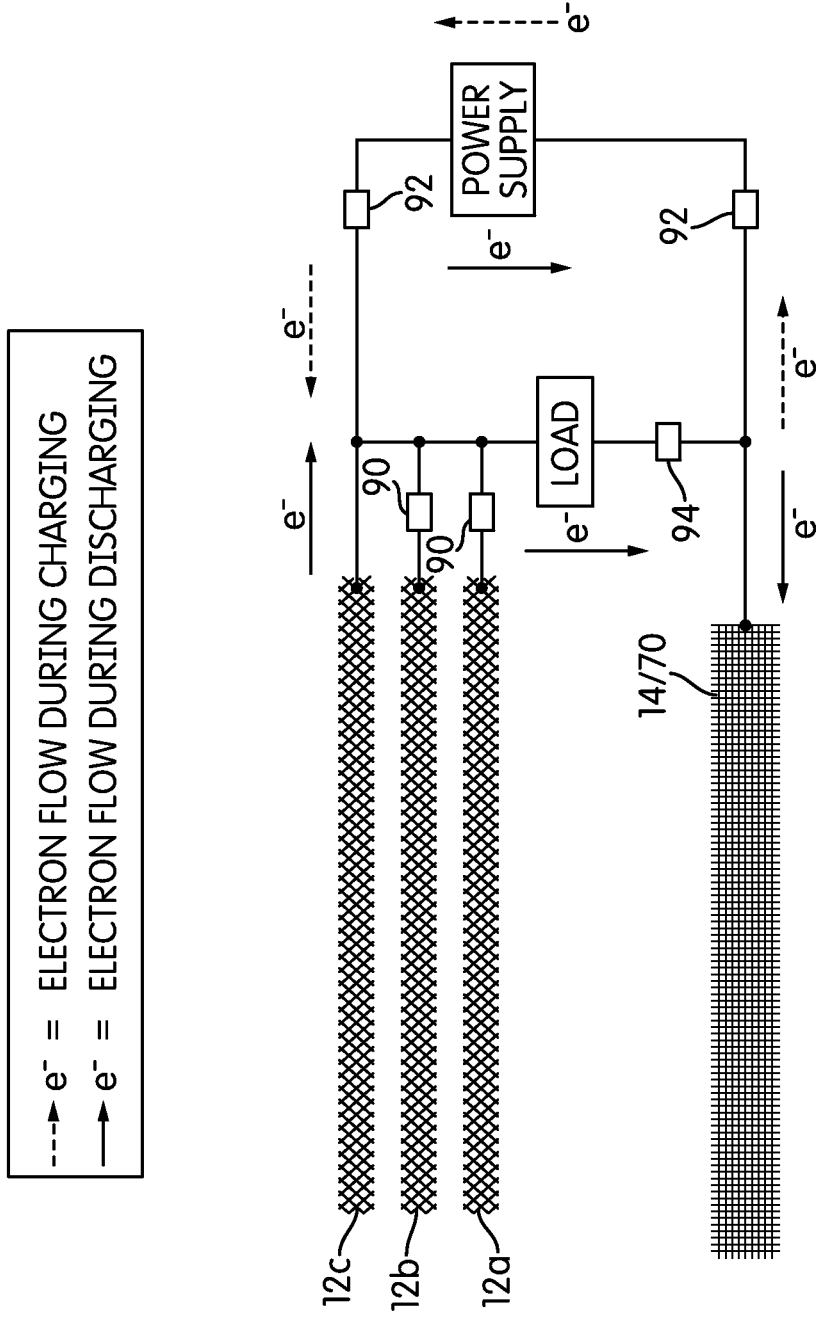
FIG. 12 shows a schematic view similar to FIG. 8, but showing yet another alternative embodiment.
Figure 13:
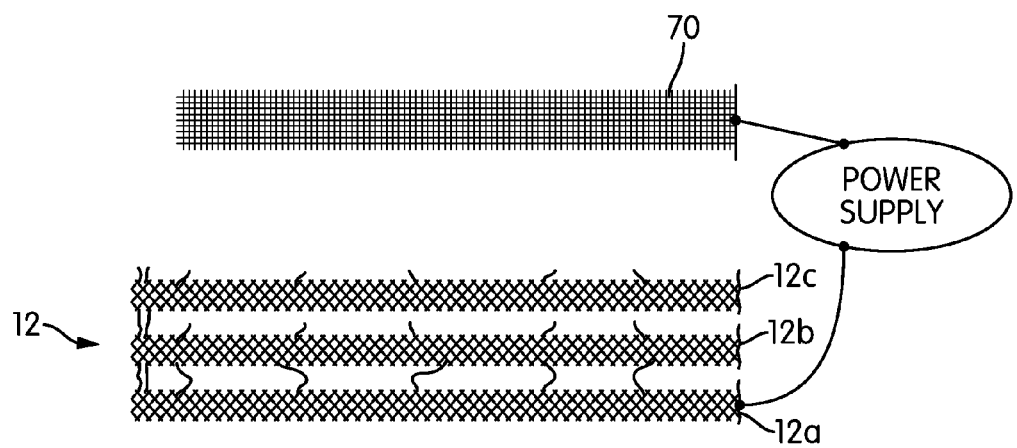
FIG. 13 is an isolated schematic view of a portion of the electrode bodies of a cell similar to those in FIGS. 8-12, showing the electrodeposited fuel growth thereon, and highlighting detrimental edge effects.

FIGS. 11 and 12 show alternative embodiments of the prior configuration where each of the bodies 12a-12c are coupled to the load. Using such an approach is desirable, as during power generation (i.e., discharge), oxidization may be occurring throughout the electrode 12, thus liberating electrons for conduction to the load. By connecting terminals for current collection purposes to all the electrode bodies 12a-12c, these electrons can be collected directly from each electrode body. Moreover, this arrangement is desirable because it still allows for current collection from oxidation reactions on-going at electrode bodies that have become "disconnected" from the other electrode bodies by consumption of the growth between the bodies. Such a condition may occur during power generation or discharge based on various factors. In some embodiments, this may be preferred over using a single terminal for purposes of connection to the load, as discussed above.

FIG. 11 shows an embodiment similar to FIG. 8, but with the load selectively coupled to each of the electrode bodies 12a-12c of the fuel electrode 12, and also to the oxidant electrode 14 (which in this case is not the same as the charging electrode 70 and is spaced apart as shown). Thus, during current generation, the fuel on the fuel electrode 12 is oxidized, generating electrons that are conducted to power the load and then conducted to the oxidant electrode 14 for reduction of the oxidizer (as discussed in more detail above). FIG. 11 also schematically illustrates a power supply used for charging purposes coupled between the charging electrode 70 and the electrode body 12a. As discussed above in more detail, the power supply applies a potential difference between the terminal electrode body 12a and the charging electrode 70 such that the fuel is reduced and electrodeposited onto the terminal electrode body 12a and the corresponding oxidation reaction takes place at the charging electrode 70. To ensure that the growth occurs in the optional progressive manner from electrode body 12a in the direction towards electrode body 12c as discussed above, one or more current isolators 90 are provided to isolate the other electrode bodies 12b-12c from the circuit connected to the power supply.

The current isolators 90 prevent current from flowing among the electrode bodies 12a-12c, except as enabled by the progressive growth of the fuel during charging. The current isolators 90 also isolate the electrode bodies 12b-12c from direct connection with the power supply, such that the only connection is that established by the progressive growth. Stated differently, the isolators 90 prevent the potential of the power supply from being applied directly to those electrode bodies 12b-12c via the circuit during charging. As such, the only way for the electrical current/potential to be applied to those electrode bodies 12b-12c is via the electrodeposited growth as described above.

The current isolators 90 may take any form, and no particular isolator should be regarded as limiting. For example, a current isolator 90 may be provided by one or more diodes that are oriented to allow electrons to flow from an electrode bodies 12a-12c to the circuit portion comprising the load, but prevent any current flow in the opposite direction. Likewise, a current isolator 90 may be a switch that is closed during power generation/discharge to connect an electrode body 12a-12c to the circuit portion comprising the load, and that is open during charging to disconnect and isolate the electrode body 12a-12c from that circuit. Any suitable control mechanism may be provided to control the action of the switch between the open and closed positions. For example, a relay switch that is biased toward the open position may be used, with an inductive coil coupled to the power supply that causes closure of the switch when charging begins. Further, a more complex switch that allows for individual connection to a plurality of the electrode bodies 12a-12c could be used to provide the connection/disconnection to and from the load, and to and from each other. Also, the current isolators may be different elements, such as a switch for current isolator 90 at electrode body 12a, and one-way diodes at the other electrode bodies 12b-12c. The flow of electrons is shown in dashed and solid arrows in FIG. 11 to illustrate the general functionality of the current isolator(s). Any other suitable electrical component that provides such isolation may be used.

Also, the configuration of FIG. 11 may be altered to work with any of the alternative embodiments described herein, or any other embodiments within the scope of the invention. For example, if another electrode body (e.g., body 12c) is used as the terminal electrode body during charging, then the power supply may be coupled to that electrode body and one or more current isolators may be used during charging to isolate the electrode body from the circuit comprising the load and the other electrode bodies.

FIG. 12 shows an embodiment where the oxidant electrode 14 is also the charging electrode (hence, it has been labeled both 14 and 70 in the Figure). Thus, the oxidant electrode 14 functions as the cathode during power generation/discharge, and as the anode during charging, as described above. In FIG. 12, the load is selectively coupled to each of the electrode bodies 12a-12c of the fuel electrode 12, and also to the oxidant electrode 14. Thus, during current generation, the fuel on the fuel electrode 12 is oxidized, generating electrons that are conducted to power the load and then conducted to the oxidant electrode 14 for reduction of the oxidizer (as discussed in more detail above). FIG. 12 also schematically illustrates a power supply used for charging purposes coupled between the oxidant electrode 14 and the terminal electrode body 12a. As discussed above in more detail, the power supply applies a potential difference between the terminal electrode body 12a and the oxidant electrode 14 such that the fuel is reduced and electrodeposited onto the terminal electrode body 12a, and the corresponding oxidation reaction takes place at the oxidant electrode 14 (functioning as the charging electrode). To ensure that the growth occurs in a progressive manner from electrode body 12a in the direction towards electrode body 12c as discussed above, one or more current isolators 90 are provided to isolate the other electrode bodies 12b-12c from the circuit connected to the power supply. Also, one or more, and in this case a pair, of optional second current isolators 92 are provided to isolate the power supply from the electrodes 12, 14/70 during power generation. An optional third current isolator 94 is provided to isolate the oxidant electrode 14 and the power supply from the circuit comprising the load and the other electrode bodies 12a-12c during charging.

Similarly to the current isolator in FIG. 11, the current isolators 90 in FIG. 12 prevent current from flowing directly between the other electrode bodies 12b-12c and the power supply via the circuit during charging, and also among the electrode bodies, except as enabled by the progressive growth of the fuel. Stated differently, the isolators 90 prevent the potential of the power supply from being applied directly to those electrode bodies 12b-12c via the circuit during charging. Thus, the electrical current/potential is only applied to electrode bodes 12b-12c via the electrodeposition growth as described above. Preferably, the current isolator 90 in FIG. 12 is a switch that moves between open and closed positions, as a diode would not provide an isolation function in the illustrated design. Likewise, the second current isolators 92 prevents current from flowing between the electrodes and the power supply during power generation, but allows current to flow from the power supply during charging; and the third current isolator 94 prevents current from flowing between the oxidant electrode and the circuit portion comprising the load and the other electrode bodies 12a-12c during charging, but allows current to flow from the load to the oxidant electrode 14 during power generation. These second and third current isolators may be omitted in some systems. As such, the only way for the electrical current/potential to be applied to those electrode bodies 12b-12c is via the electrodeposited growth as described above. The current isolators may take any form, including those mentioned above, and no particular isolator should be regarded as limiting.

It is also possible in any of the embodiments of the invention to apply the cathodic potential simultaneously to all the electrode bodies of the anode, rather than to just one to produce body-by-body progressive growth. Progressive growth emanating from one terminal is advantageous because it provides more dense growth of electrodeposited fuel. Specifically, the growth in the previously connected electrode bodies continues as each subsequent body is connected by the progressing growth. However, progressive growth provides less active area for electrodeposition and hence takes more time at fixed current density or potential than applying the cathodic potential to multiple electrode bodies simultaneously. With all the electrode bodies subject to the same potential, the growth will only occur until a short occurs between the charging electrode 14/70 and the electrode body proximate to it. Thus, it is possible to have a faster, but less dense, growth in this manner, which may be amenable to certain re-charging needs.

Other embodiments of the present invention may have different electrical connections and circuitry, including other switching mechanisms that may make use of current isolators. For example, see the embodiments found in U.S. patent application Ser. No. 12/885,268, which has been incorporated herein by reference.

As mentioned with respect to some scaffolded cells of the type described above, fuel growth during charging may be drawn from the fuel electrode 12 in a direction towards the charging electrode 70. Such a direction of growth may also be found with respect to cells wherein ionically conductive medium flow runs parallel to the electrodes, as will be discussed in greater detail below. The reason for such a direction of fuel growth may include the flow direction of the ionically conductive medium, and electrical field lines present between the fuel electrode 12 and the charging electrode 70.

The cells 10 schematically illustrated in FIGS. 8-12 has generally been depicted with electrode bodies 12a-c of the fuel electrode 12 being of a similar planar size. As seen in FIG. 13, in some cells 10 of this type, for reasons predominantly related to the electrical field lines present between the fuel electrode 12 and the charging electrode 70, the growth may be greater at the edges of each of the electrode bodies 12a-c. Such enhanced growth may cause electrical connections to form between each of the electrode bodies 12a-c at a rate faster than desirable. Enhanced edge growth at the terminal electrode body 12a may cause electrical connections to form at the edges of the permeable electrode bodies, causing premature growth to begin on subsequent electrode bodies, reducing dense growth in the interior region of the initial electrode bodies. For example, as FIG. 13 depicts, the edge growth has electrically connected permeable electrode body 12c to permeable electrode body 12b, beginning growth on electrode body 12c without having formed dense growth on permeable electrode body 12b. To delay the formation of such premature electrical connections between edges of the electrode bodies 12a-c, such edge effects are corrected for by the present invention, as described below.

Figure 14:
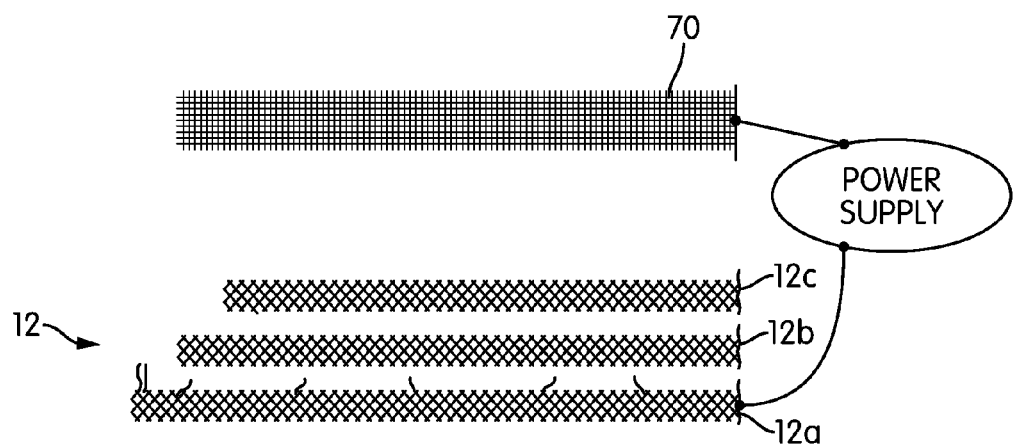
FIG. 14 is an isolated schematic view of a portion of an embodiment of a cell of the present invention, wherein the electrode bodies have a stepped scaffold configuration, showing the electrodeposited fuel growth thereon.

To prevent the effects of this edge growth, a stepped scaffold configuration for the permeable electrode bodies 12a-c may be utilized, wherein the planar sizes of the permeable electrode bodies are smaller than one another in the direction of growth, so that the edge growth cannot contact and electrically connect the permeable electrode bodies 12a-c. As seen in the embodiment of FIG. 14, the electrode bodies 12a-c may be arranged so that permeable electrode body 12a is defined to be the terminal electrode body for charging of the electrochemical cell, and is positioned distal from the charging electrode 70. A proximal electrode body, seen in the illustrated embodiment as permeable electrode body 12c, is spaced proximal to the charging electrode 70. In other embodiments, wherein there are fewer than three permeable electrode bodies, the distal electrode body could remain electrode body 12a, but the proximal electrode body could be electrode body 12b (for embodiments with only two permeable electrode bodies in the fuel electrode 12). Likewise, if there are greater than three permeable electrode bodies, the proximal electrode body could be, for example, electrode body 12*h* (for embodiments with eight permeable electrode bodies in the fuel electrode 12).

In the illustrated configuration, the distal electrode body, permeable electrode body 12*a*, would have the largest planar size of the electrode bodes 12*a-c*. In the direction of dendrite formation towards the charging electrode 70, each subsequent electrode body 12*b-c* would have a subsequently smaller planar size (planar size refers to the general surface area defined by the periphery of the body, and does not necessarily mean it is flat). For example, in the illustrated embodiment of FIG. 14, the terminal and distal electrode body 12*a* has a larger planar size than the proximal electrode body positioned closest to the charging electrode 70, again shown in the Figures as permeable electrode body 12*c*. In embodiments with more than two permeable electrode bodies, each subsequent electrode body in the direction of dendrite growth has a smaller planar size than the electrode body which preceded it, wherein at least one edge of the larger electrode bodies extends further than subsequent smaller electrode bodies. That is, each electrode body has a progressively smaller size in the distal to proximal direction, with the edges (on one or more sides) of each electrode body located inward of the edge of the adjacent electrode body in a distal direction in a progressive manner. In such a configuration, wherein along a peripheral edge of the fuel electrode 12, an edge of the proximal electrode body 12*c* is located inward of an edge of the distal electrode body 12*a*, a stepped scaffold appearance is formed. In some embodiments, only a subgroup of electrode bodies 12*a-c* would have the stepped configuration.

In numerous embodiments, insulating material may be provided around some or all of the edges of the electrode bodies 12*a-c*. The insulating material may further protect against rough or non-uniform growth at the edges of the electrode bodies 12*a-c*, such as the enhanced growth described above. The insulating material is only a rim or edge covering, and thus terminates inward of the edge. Where the insulating material extends about the entire periphery of a body, it may be regarded as a rim. The insulating material may be of any suitable construction or configuration, including but not limited to insulating materials constructed from plastic, rubber, or glass. In some embodiments, the insulating material may be applied as a coating material. In an embodiment, the insulating material may comprise epoxy or another form of polymer.

Figure 15:
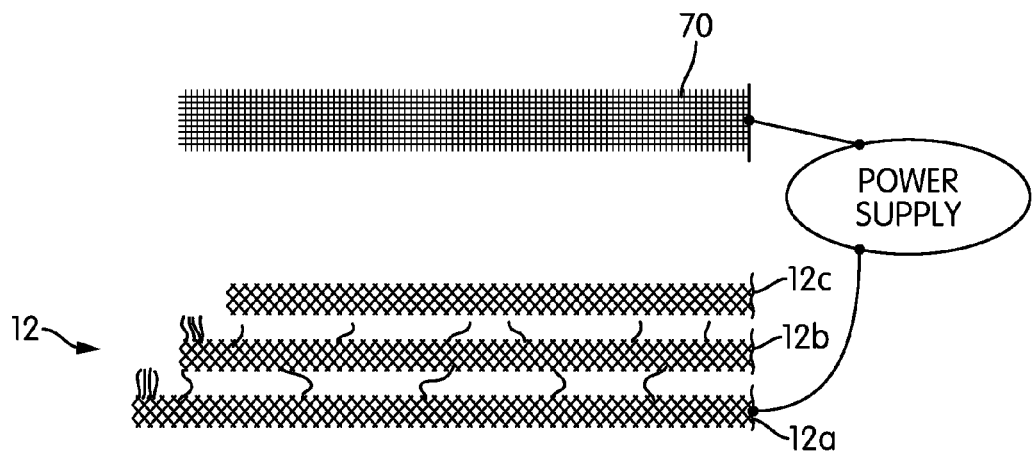
FIG. 15 shows the progression of the growth in FIG. 14.
Figure 16:
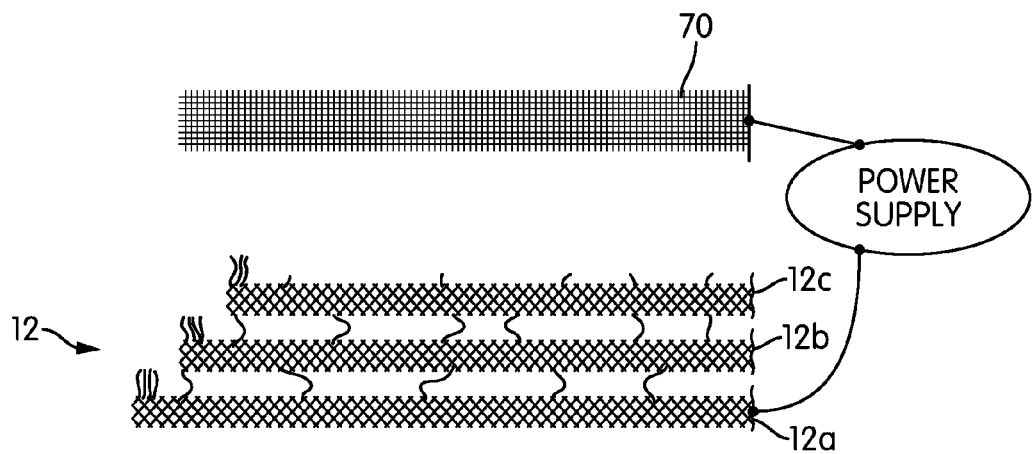
FIG. 16 shows the continued progression of the growth in FIGS. 14 and 17.

FIGS. 15-16 illustrate the growth morphology progressing from that of FIG. 14 in an exaggerated format to better understand the basic principles of operation. In a practical execution, the growth will typically be significantly denser throughout electrode bodies 12*a-c*.

During the initial reduction of the fuel ions and electrodeposition of the metal fuel dendrites begin their growth on the terminal electrode body 12*a*. This is because electrode body 12*a* is connected to the external current, and has a cathodic potential that causes the reduction of the fuel ions and electrodeposition of the fuel thereon (while the charging electrode 70 is connected the external load and functions as the anode). In contrast, the remaining electrode bodies 12*b-c* are initially inactive and do not function as a reduction site because they are not connected to the external current.

The growth continues with the metal growing as a series of dendrites from electrode body 12*a* towards electrode body 12*b*. This then establishes an electrical connection between electrode bodies 12*a* and 12*b*, which in turn causes electrode body 12*b* to now also have the cathodic potential applied to it. The cathodic potential of electrode body 12*b* allows dendrite formation in the direction towards electrode body 12*c*, as is seen in FIG. 15. Due to the electrical field producing enhanced growth at the edge of electrode body 12*b*, electrical contact to electrode body 12*c* would have already occurred at this stage of growth, had the edge of electrode body 12*c* extended into the area of enhanced growth. Since the stepped scaffold configuration has prevented such overlap, the electrical connection between electrode bodies 12*b* and 12*c* is delayed, delaying the cathodic potential being applied to electrode body 12*c*, and thus extending the period for growth on electrode body 12*b* before shorting to electrode body 12*c*. (The same delay also occurred between electrode bodies 12*a* and 12*b*.)

The growth thereafter continues with the fuel ions being reduced and electrodeposited as metal fuel on electrode body 12*b*, eventually establishing a delayed electrical connection between electrode bodies 12*a*, 12*b* and 12*c*. This in turn causes electrode body 12*c* to now also have the cathodic potential applied to it, beginning dendrite growth towards the charging electrode, as shown in FIG. 16.

The growth then continues with the fuel ions being reduced and electrodeposited as metal fuel on electrode body 12*c*, eventually establishing an electrical connection between electrode bodies 12*a*, 12*b*, and 12*c*. This in turn causes electrode body 12*c* to also have the cathodic potential applied to it, beginning dendrite growth towards the charging electrode. This growth pattern will continue throughout the permeable electrode bodies 12*a-c* in the fuel electrode 12. Eventually, the growth on the last body 12*c* may reach to the charging electrode, shorting the circuit and indicating completion of the growth.

Figure 17:
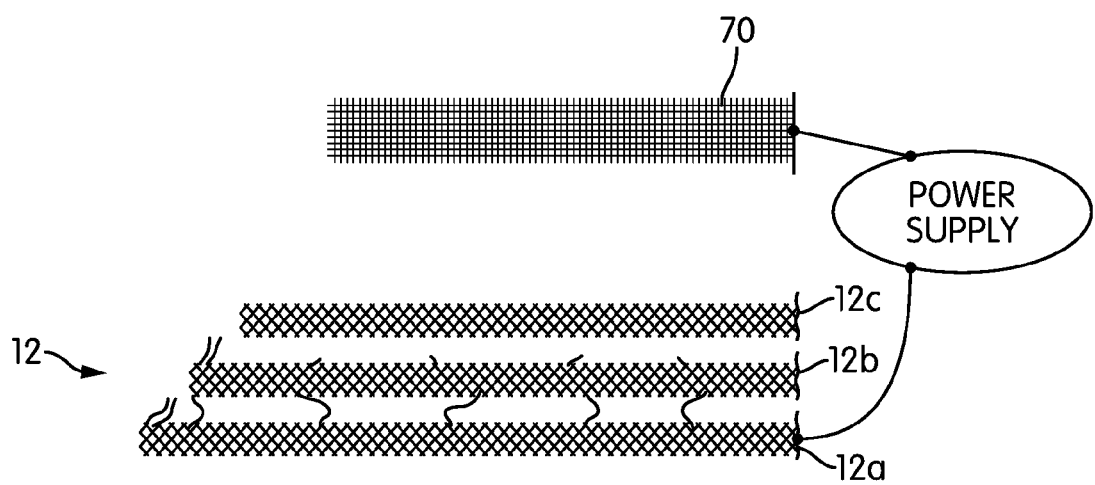
FIG. 17 shows a schematic view similar to FIG. 14, but showing yet another alternative embodiment.

The stepped scaffold configuration can be utilized with any of the alternative embodiments described herein, or any other embodiments in general. For example, as seen in FIG. 17, the charging electrode 70 may be stepped to be smaller than the electrode body that is closest to the charging electrode. In the illustrated embodiment, the charging electrode 70 is smaller than the smallest electrode body 12*c*. In an embodiment, the growth may be at an angle according to the electrical field between the fuel electrode 12 and the charging electrode 70. Such an embodiment may prevent a premature shorting between the proximal electrode body 12*c* and the charging electrode, allowing for denser growth on proximal electrode body 12*c*. In an alternative embodiment, the charging electrode 70 may be sized to be greater than the electrode body that is closest to the charging electrode 70. In another embodiment, the charging electrode 70 may be the same size as the electrode body that is closest to the charging electrode 70. In the configuration with a separate oxidant electrode 14, the size of the oxidant electrode 14 may be chosen such that it is larger than the largest electrode body on which fuel is electrodeposited. This ensures complete oxidation of fuel during discharge.

Figure 18:
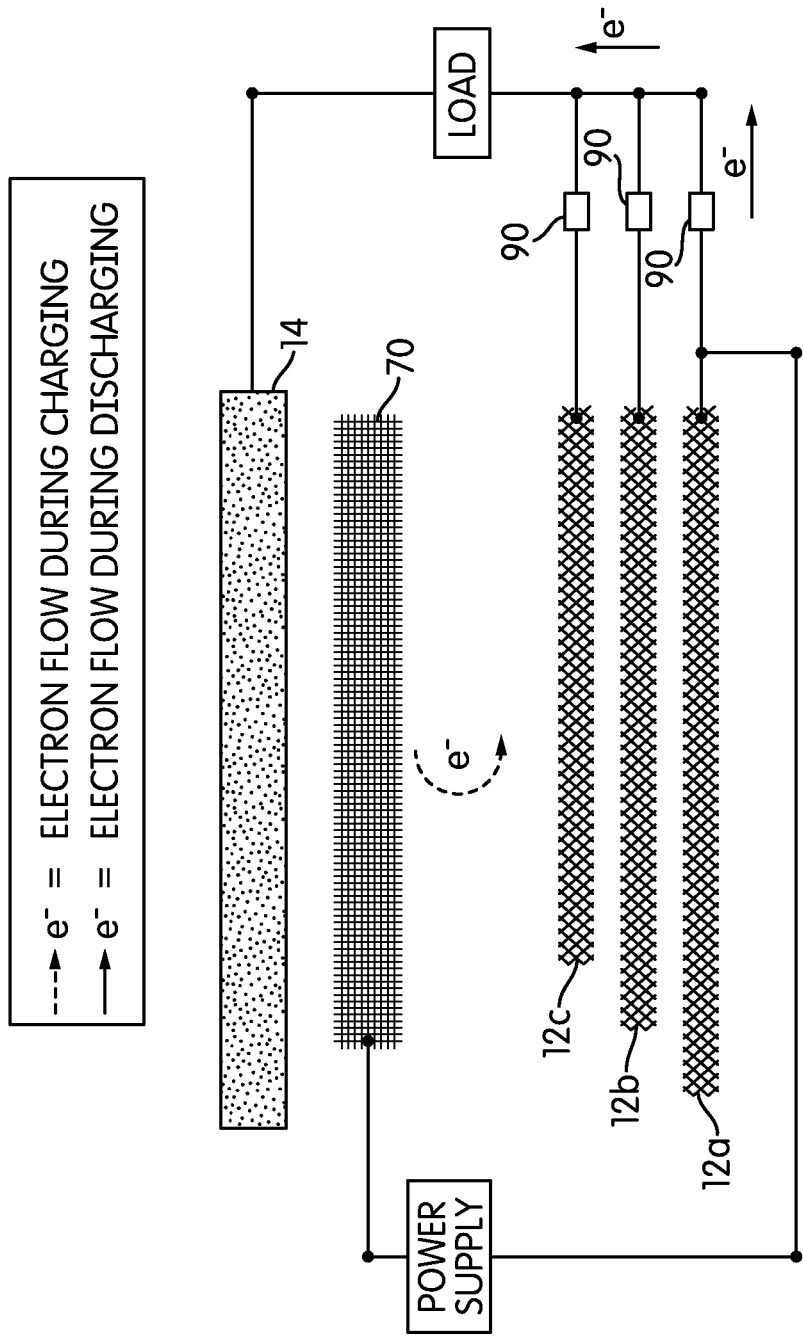
FIG. 18 is a schematic view similar to FIG. 14, but showing an alternative embodiment.
Figure 19:
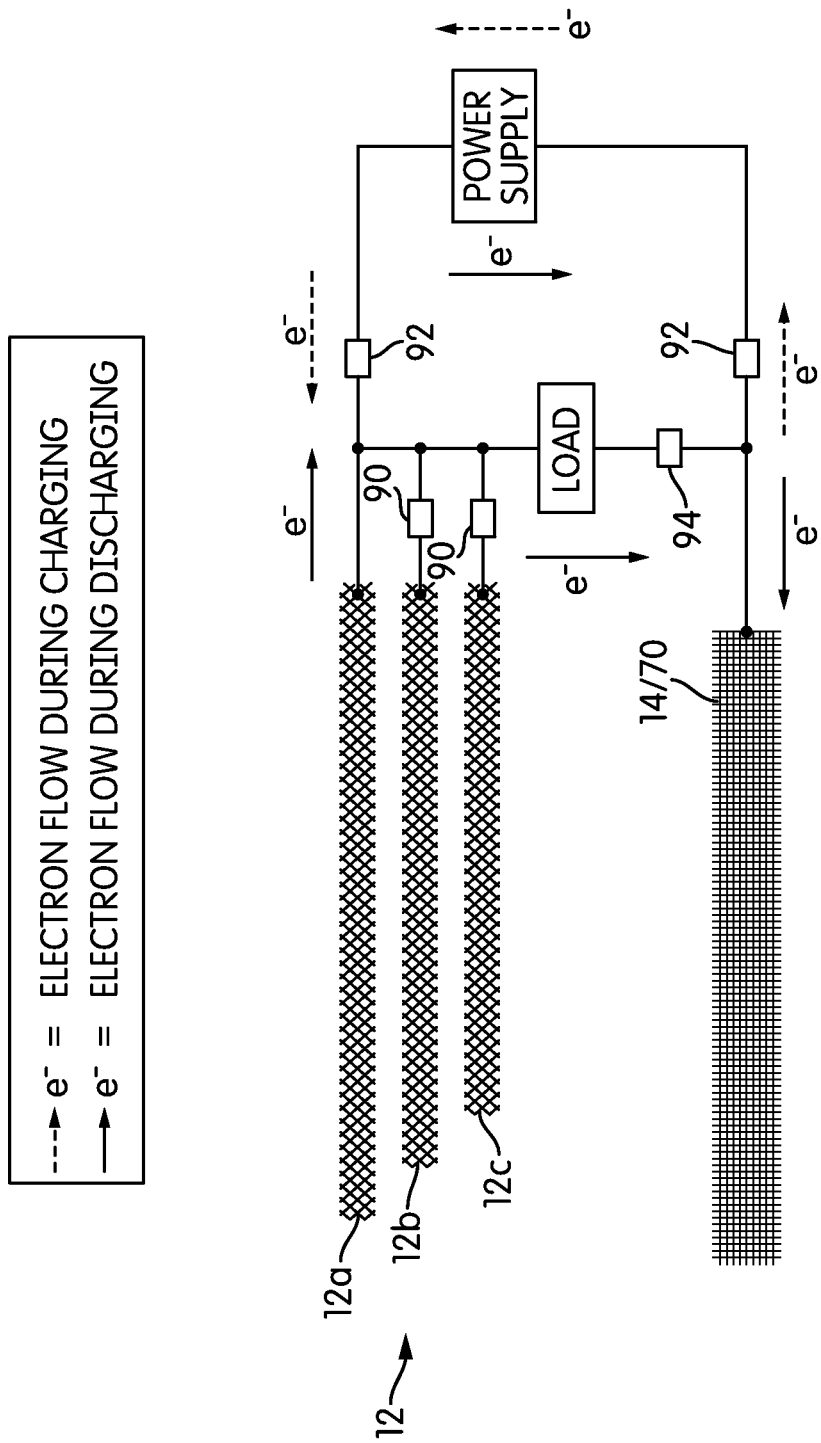
FIG. 19 shows a schematic view similar to FIG. 14, but showing yet another alternative embodiment.

For another example, as seen in FIG. 18, the plurality of electrode bodies 12*a-c* may be coupled to terminal electrode body 12*a*, while the electrode bodies 12*a-c* may be selectively coupled to one another, or individually selected, through one or more current isolators 90, to couple to a load during discharge of the electrochemical cell, such as was described above with respect to the embodiment of FIG. 11. Similarly, in embodiments such as that seen in FIG. 19, wherein the oxidant electrode 14 is also the charging electrode 70 (labeled both 14 and 70), the scaffold configuration may be utilized where a power supply used for charging purposes is coupled between the terminal electrode body 12*a* and the oxidant electrode 14 through one or more, and in this case a pair, of optional second current isolators 92, which may disconnect the power supply during current generating operation. Such an embodiment would be analogous to the embodiment described above with respect to the embodiment of FIG. 12. Likewise, an optional third current isolator 94 may be utilized between the load and the oxidant electrode 14/charging electrode 70 to prevent current from flowing between the oxidant electrode and the circuit portion comprising the load and the other electrode bodies 12a-12c during charging, but allows current to flow from the load to the oxidant electrode 14 during power generation.

Figure 20:
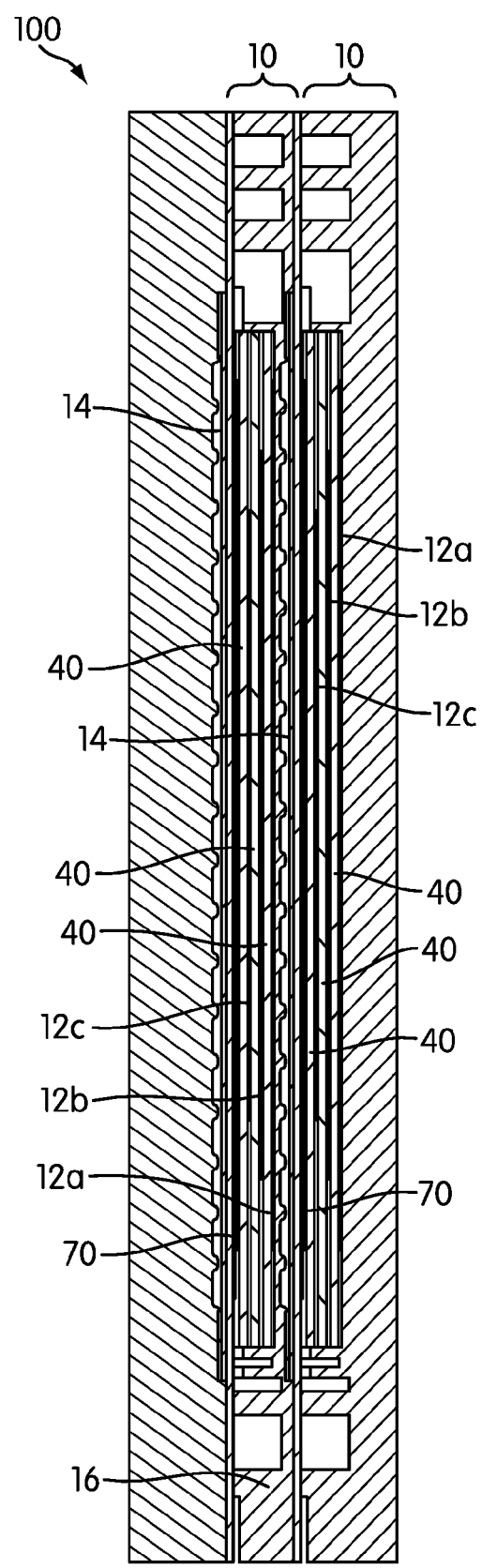
FIG. 20 shows a cross sectional view similar to FIG. 1, but showing an alternative embodiment with the stepped scaffold configuration.
Figure 21:
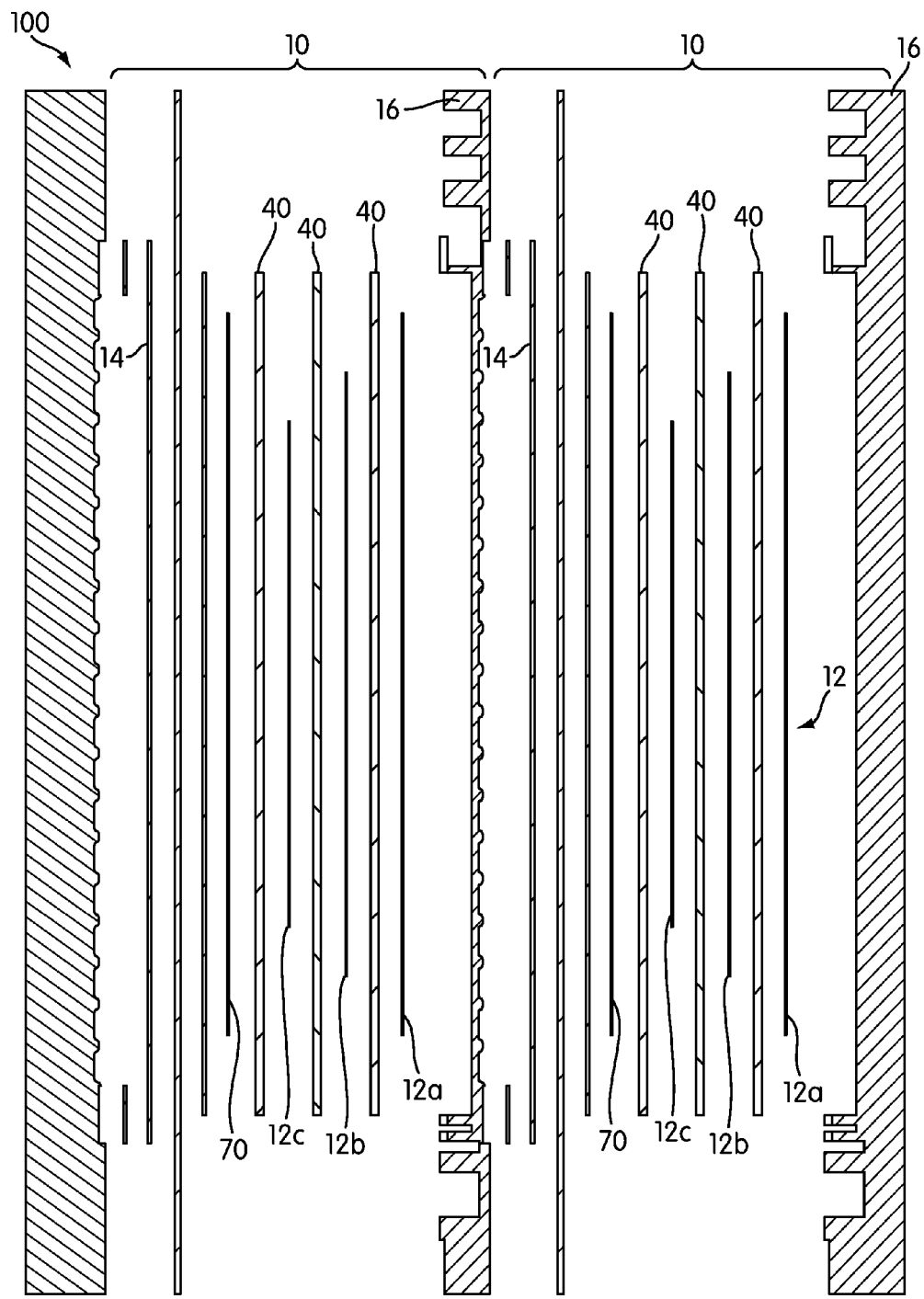
FIG. 21 shows an exploded view of the embodiment of FIG. 20.

Seen in FIGS. 20 and 21 is the stepped scaffold configuration as utilized in the configuration of the electrochemical cell system 100 first depicted in FIGS. 1 and 2, having electrode bodies 12a-c. As shown, the oxidant electrode 14 (i.e. the air breathing cathode) may be larger than the largest of the permeable electrode bodies 12a. Although, the charging electrode 70 is depicted as being of a similar size to the largest of the permeable electrode bodies 12a, in other embodiments the charging electrode 70 may be larger or smaller than the largest permeable electrode body 12a, or the smallest permeable electrode body 12c, as is noted above.

Figure 22C:
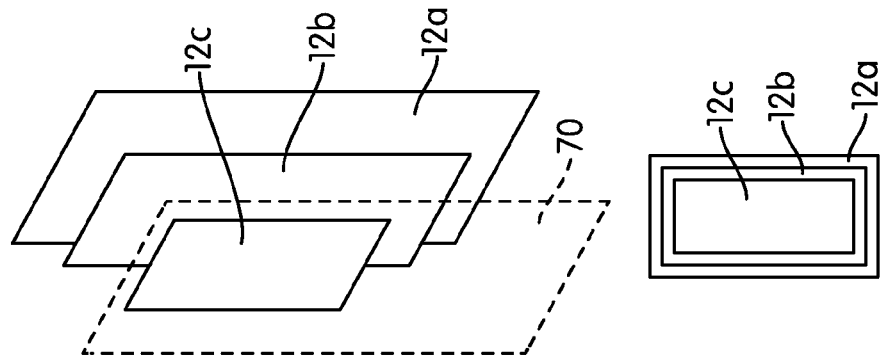
FIGS. 22a through 22c show isolated schematic views of differing embodiments of the electrode bodies in exploded and cross sectional views.
Figure 22B:
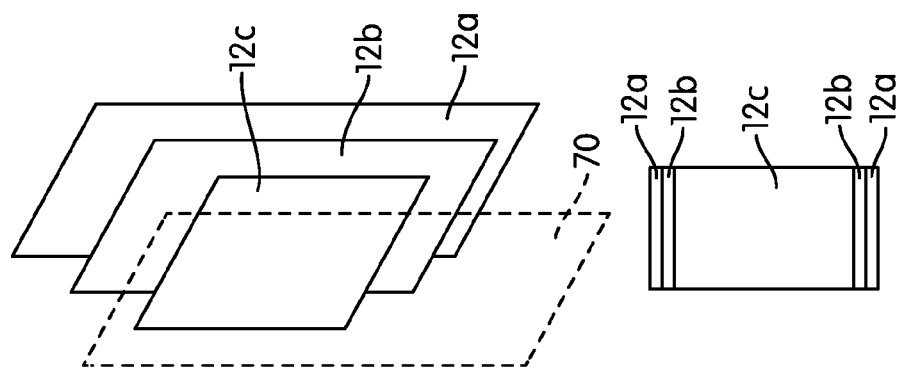
Figure 22A:
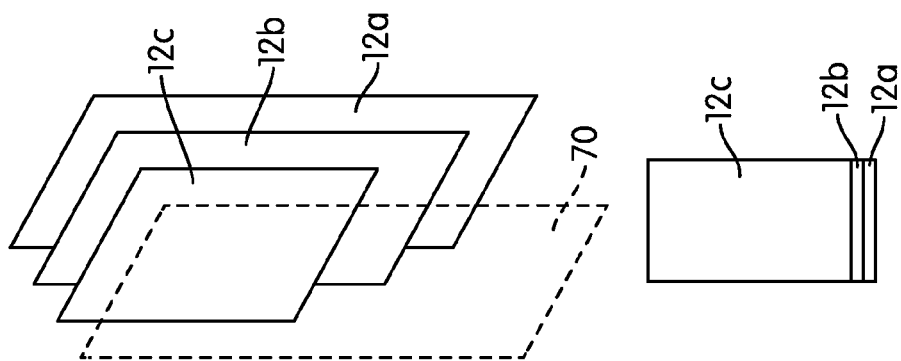
Figure 23A:
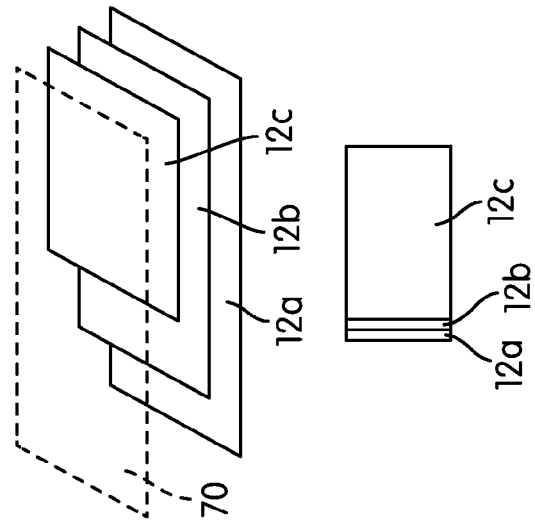
FIGS. 23a through 23c show alternative embodiments of the electrode bodies in FIGS. 22a through 22c, having a different orientation.
Figure 23B:
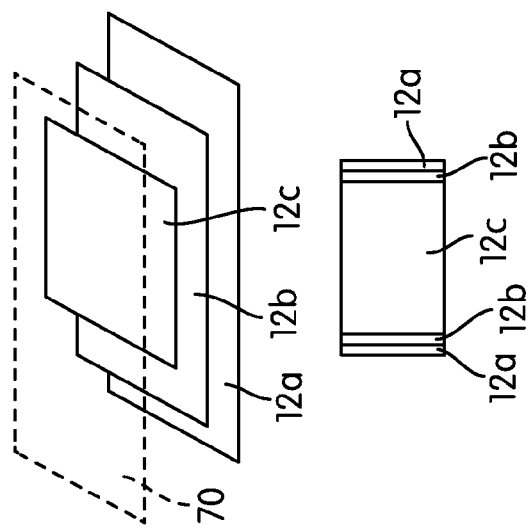
Figure 23C:
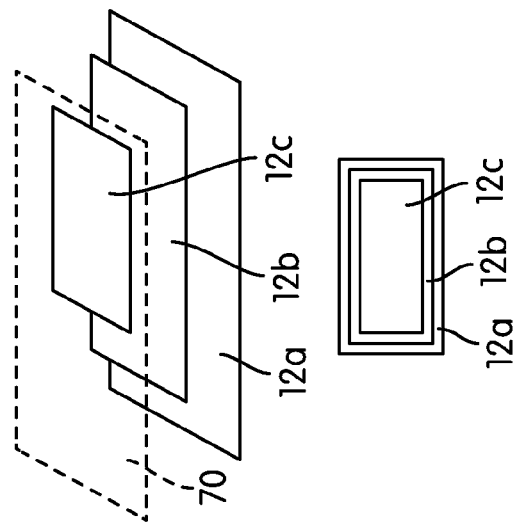

Finally, as seen in the non-limiting exemplary illustrations of FIGS. 22a-c, like in the embodiments described above, the stepped scaffold configuration may in various embodiments be applied to one edge of the electrode bodies 12a-12c (FIG. 22a), two edges of the electrode bodies 12a-12c (FIG. 22b), or more (i.e. FIG. 22c). Such variations on the stepped scaffold configurations may be desired depending on the positioning and shape of the charging electrode 70, or the direction of flow of ionically conductive medium within the cell 10. Likewise, in such embodiments, the orientation of the electrode bodies may be different. As a non-limiting example, as seen in FIGS. 23a-c, the orientation may be horizontal, instead of vertical, for each of electrode bodies 12a-c and charging electrode 70. Additionally, in some embodiments only a subgroup of the electrode bodies 12a-12c would have the stepped scaffold configuration (and the proximal and distal bodies would be identified within that subgroup).

Also, in some embodiments, the cells may be designed as "bi-cells." That term refers to a pair of air electrodes that are on opposing sides of a fuel electrode. During discharge, the air electrodes are at generally the same cathodic potential and the fuel electrode is at an anodic potential. Typically, a pair of dedicated charging electrodes may be disposed in the ionically conductive medium between the air electrodes and the fuel electrode (although the air electrodes could also be the charging electrodes, as discussed above, or the charging electrodes could be bodies of the fuel electrode, as discussed below). During charging, the charging electrodes are at generally the same anodic potential, and the fuel electrode is at a cathodic potential (alternatively, the charging electrode may dynamically charge, as described above). Thus, the air electrodes may share a common terminal, and the fuel electrode has its own terminal, and the charging electrodes may also share a common terminal. As such, electrochemically speaking, such a bi-cell may be regarded as a single cell (although within the bi-cell, certain aspects of the cell, such as bi-directional fuel growth, may cause a bi-cell to be considered as two cells for certain purposes; however, at a higher level for mode discharging and connection management, those aspects are less relevant and the bi-cell can be functionally viewed as a single cell). In an embodiment, the pair of air electrodes may correspond to the second electrode 12, the fuel electrode may correspond to the first electrode 12, and the pair of charging electrodes may correspond to the third electrode 70.

In addition, any of the embodiments of the switches described above (e.g., to enable the charge mode, and discharge mode) may also be used with a plurality of electrochemical cells having a dynamically changing oxygen evolving (i.e., charging) electrode/fuel electrode, such as the progressive one described in U.S. patent application Ser. No. 61/383,510, filed Sep. 16, 2010 and incorporated in its entirety herein by reference. For example, as described in U.S. Provisional Patent Application Ser. No. 61/383,510, each cell 10 may also have its own plurality of switches associated with the electrode bodies to enable progressive fuel growth.

For example, in an embodiment, during charging, the charging electrode of each cell 10 may be coupled to the fuel electrode 12 of the subsequent cell 10. In an embodiment, during charging, a first electrode body 12a of the fuel electrode 12 may have a cathodic potential and the rest of the electrode bodies and/or an optional separate charging electrode may have an anodic potential, thus causing those bodies and any separate charging electrode to collectively function as a charging electrode. In such an embodiment, during the progressive fuel growth of the fuel electrode 12, the fuel may grow on the fuel electrode body 12a having the cathodic potential and cause a short with the adjacent electrode body 12b having the anodic potential. The adjacent electrode body 12b may then be disconnected from the source of anodic potential such that through electrical connection established by the electrodeposited metal, the adjacent electrode body 12b also has the cathodic potential. This process may continue with the rest of the electrode bodies until no further growth is possible (i.e., the cathodic potential has shorted to the last electrode body of the fuel electrode 12 having an anodic potential or a separate charging electrode). A plurality of switches may be provided to connect/disconnect the electrode bodies to one another and/or to sources of cathodic or anodic potential. Thus, in such embodiments having progressive fuel growth, the charging electrode may be a separate charging electrode from the fuel electrode 12 or may be at least the adjacent electrode body of the first electrode 12, up to all the other electrode bodies, having an anodic potential. In other words, the charging electrode may be a separate charging electrode, an individual electrode body of the fuel electrode 12 having an anodic potential located adjacent to the at least one electrode body having a cathodic potential, and/or a group of electrode bodies of the fuel electrode having an anodic potential located adjacent to the at least one electrode body having a cathodic potential.

Thus, in the Figures shown, the charging electrode 70 could be considered part of the fuel electrode 12, and may initially be body 12b or bodies 12b and up, while the cathodic potential is applied to body 12a. Then, body 12b would be disconnected from the anodic potential but be connected to the cathodic potential, and body 12c (or bodies 12c and up) would be the charging electrode 70, and so on. Thus, the charging electrode, as that term is used in the broader aspects of this application, need not necessarily be a static or dedicated electrode that only plays the anodic charging role (although it may be), and it may at times be a body or bodies within the fuel electrode to which an anodic potential is applied. Hence, the term dynamic is used to refer to the fact that the physical element(s) functioning as the charging electrode and receiving an anodic potential during charging may vary.

Where electrodes are referred to herein, it should be understood that various structures in some embodiments may function as one or more electrodes in different ways depending on the operational mode of the device. For example, in some embodiments where the oxidant electrode is bi-functional as a charging electrode, the same electrode structure acts as an oxidant electrode during discharging and as a charging electrode during charging. Similarly, in the embodiment where the charging electrode is a dynamic charging electrode, all of the bodies of the fuel electrode act as the fuel electrode during discharging; but during charging one or more of the bodies act as the fuel electrode by receiving electrodeposited fuel and one or more other of the bodies act as the charging electrode to evolve the oxidant (e.g., oxygen), and the fuel electrode grows as the electrodeposited growth connects to more of the bodies. Thus, reference to an electrode is expressly defined as either a distinct electrode structure or the functional role a structure capable of multiple electrode functions may play during different operational modes of the cell (and thus the same multi-functional structure may be considered to satisfy multiple electrodes for this reason).

The foregoing illustrated embodiments have been provided solely for illustrating the structural and functional principles of the present invention and are not intended to be limiting. For example, the present invention may be practiced using different fuels, different oxidizers, different ionically conductive mediums, and/or different overall structural configuration or materials. Thus, the present invention is intended to encompass all modifications, substitutions, alterations, and equivalents within the spirit and scope of the following appended claims.

The subject matter claimed in this application was made under a joint research agreement qualifying under 35 U.S.C. §103 (c)(2) and (3) to which Fluidic, Inc. and Arizona Science and Technology Enterprises, LLC acting as the exclusive master licensee for Arizona State University are parties.

What is claimed is:

1. A method for operating an electrochemical cell, wherein the cell comprises:
    a fuel electrode comprising a series of permeable electrode bodies arranged in spaced apart relation;
    an oxidant electrode spaced apart from the fuel electrode;
    a charging electrode spaced apart from the fuel electrode, the charging electrode being selected from the group consisting of (a) the oxidant electrode, and (b) a separate charging electrode spaced apart from the oxidant electrode;
    an ionically conductive medium communicating the electrodes;
    the series of permeable electrode bodies of the fuel electrode comprising:
        a proximal permeable electrode body, proximal to the charging electrode;
        a distal permeable electrode body, distal from the charging electrode;
    wherein, in a direction from the distal permeable electrode body to the proximal permeable electrode body, at least a portion of a peripheral edge of the proximal permeable electrode body is located inward of at least a portion of a peripheral edge of the distal permeable electrode body;
    wherein the method comprises:
        charging the electrochemical cell by:
            i. applying an electrical current between the charging electrode and at least one of the permeable electrode bodies of the fuel electrode with the charging electrode functioning as an anode and the at least one permeable electrode body functioning as a cathode, such that reducible fuel ions are reduced and electrodeposited as fuel in oxidizable form on the at least one permeable electrode body;
            ii. said electrodeposition causing growth of the fuel among the permeable electrode bodies such that the electrodeposited fuel establishes an electrical connection between the permeable electrode bodies; and
            iii. removing the electrical current to discontinue the charging.

2. A method according to claim 1, wherein the proximal electrode body has a lesser planar size than the distal permeable electrode body.

3. The method of claim 1, wherein the method further comprises: generating electrical current using the electrochemical cell by oxidizing the fuel on the permeable electrode bodies of the fuel electrode functioning as an anode and reducing an oxidizer at the oxidant electrode functioning as a cathode wherein electrons are generated for conduction from the fuel electrode to the oxidant electrode via a load, and the oxidized fuel ions and reduced oxidizer ions react to form a by-product.

4. A method according to claim 3, wherein the oxidizer comprises oxygen, and wherein the oxidant electrode comprises an electrode configured to absorb and reduce atmospheric oxygen.

5. A method according to claim 1, wherein the reducible fuel ions are reducible metal fuel ions and the electrodeposited fuel is electrodeposited metal fuel, 6. A method according to claim 5, wherein the reducible metal fuel' ions comprise ions of zinc, iron, aluminum, magnesium, or lithium, and wherein the electrodeposited metal fuel is zinc, iron, aluminum, magnesium, or lithium.

7. A method according to claim 5, wherein during said charging the electrochemical cell:
    the electrical current is applied to a terminal one of the permeable electrode bodies, such that the reducible metal fuel ions are reduced and electrodeposited as metal fuel in oxidizable form on the terminal permeable electrode body;
    said electrodeposition causing growth of the metal fuel among the permeable electrode bodies such that the electrodeposited metal fuel establishes an electrical connection between the terminal electrode body and the proximal permeable electrode body with said reduction and deposition occurring on the proximal permeable electrode body upon establishment of said electrical connection.

8. A method according to claim 7, wherein the fuel electrode further comprises one or more intermediate permeable electrode bodies; wherein said electrical connection between the terminal electrode body and the proximal permeable electrode body is established through each of said one or more intermediate permeable electrode bodies with said reduction and deposition occurring on each of the one or more intermediate permeable electrode bodies upon establishment of said electrical connection.

9. A method according to claim 7, wherein the ionically conductive medium is an electrolyte.

10. A method according to claim 9, wherein during said charging the electrochemical cell the electrolyte flows along a flow path through the permeable electrode bodies, and said electrodeposition causes growth of the metal fuel in a flow permeable morphology.

11. A method according to claim 10, wherein said growth of the metal fuel is selected from the group consisting of dense branch morphology growth and dendritic growth.

12. A method according to claim 10, wherein the growth of the metal fuel is in a direction towards the charging electrode.

13. A method according to claim 12, wherein the terminal permeable electrode body is the distal permeable electrode body.

14. A method according to claim 12, wherein said growth of the metal fuel is selected from the group consisting of dense branch morphology growth and dendritic growth.

15. A method according to claim 13, wherein said growth of the metal fuel is selected from the group consisting of dense branch morphology growth and dendritic growth.

16. A method according to claim 1, wherein the charging electrode is the oxidant electrode.

17. A method according to claim 1, wherein the charging electrode is the separate charging electrode spaced from the oxidant electrode.

18. A method according to claim 1, wherein at least a portion of the peripheral edge of the fuel electrode is coated in an insulating material.

19. A method according to claim 18, wherein the insulating material comprises plastic and/or epoxy.

20. An electrochemical cell comprising:
a fuel electrode comprising a series of permeable electrode bodies arranged in spaced apart relation;
an oxidant electrode spaced apart from the fuel electrode;
a charging electrode spaced apart from the fuel electrode, the charging electrode being selected from the group consisting of (a) the oxidant electrode, and (b) a separate charging electrode also spaced apart from the oxidant electrode;
an ionically conductive medium communicating the electrodes;
the series of permeable electrode bodies of the fuel electrode comprising:
a proximal permeable electrode body, proximal to the charging electrode;
a distal permeable electrode body, distal from the charging electrode;
wherein, in a direction from the distal permeable electrode body to the proximal permeable electrode body, at least a portion of a peripheral edge of the proximal permeable electrode body is located inward of at least a portion of a peripheral edge of the distal permeable electrode body,
wherein the spaced apart relation of said permeable electrode bodies of the fuel electrode enables an electrical current to be applied between the charging electrode and at least one of the permeable electrode bodies of the fuel electrode with the charging electrode functioning as an anode and the at least one permeable electrode body functioning as a cathode, such that reducible fuel ions are reduced and electrodeposited as fuel in oxidizable form on the at least one permeable electrode body, wherein the electrodeposition causes growth of the fuel among the permeable electrode bodies such that the electrodeposited fuel establishes an electrical connection between the permeable electrode bodies.

21. The electrochemical cell of claim 20, wherein the proximal permeable electrode body has a lesser planar size than the distal permeable electrode body.

22. The electrochemical cell of claim 21, wherein the fuel electrode further comprises one or more intermediate permeable electrode bodies, the one or more intermediate permeable electrode bodies being in spaced relation between the distal permeable electrode body and the proximal permeable electrode body,
wherein each of the permeable electrode bodies more proximal to the charging electrode has a lesser planar size than each of the permeable electrode bodies more proximal to the charging electrode, such that along at least a portion of a peripheral edge of the fuel electrode, the edges of each of the proximal and intermediate permeable electrode bodies are located inward of the edge of the adjacent electrode body in the distal direction in a progressive manner.

23. The electrochemical cell of claim 20, wherein the oxidant electrode is configured to, in a discharge mode, absorb and reduce atmospheric oxygen.

24. The electrochemical cell of claim 20, wherein the charging electrode is larger in area than any of the permeable electrode bodies in the series of permeable electrode bodies.

25. The electrochemical cell of claim 20, wherein the charging electrode is smaller in area than any of the permeable electrode bodies in the series of permeable electrode bodies.

26. The electrochemical cell of claim 20, wherein the oxidant electrode is larger in area than any of the permeable electrode bodies in the series of permeable electrode bodies.

27. The electrochemical cell of claim 20, wherein the fuel electrode further comprises one or more intermediate permeable electrode bodies between the distal and proximal electrode bodies, the electrode bodies being spaced apart from one another, wherein along said at least the portion of the fuel electrode, the edges of each of the proximal and intermediate electrode bodies are located inward of the edge of the adjacent electrode body in the distal direction in a progressive manner.

28. The electrochemical cell of claim 20, wherein the reducible fuel ions are reducible metal fuel ions, and the electrodeposited fuel is electrodeposited metal fuel.

29. The electrochemical cell of claim 28, wherein the reducible metal fuel ions comprise ions of zinc, iron, aluminum, magnesium, or lithium, and wherein the electrodeposited metal fuel is zinc, iron, aluminum, magnesium, or lithium.

30. The electrochemical cell of claim 20, wherein the ionically conductive medium comprises an electrolyte.

31. The electrochemical cell of claim 20, wherein the charging electrode is the oxidant electrode.

32. The electrochemical cell of claim 20, wherein the charging electrode is the separate charging electrode spaced from the oxidant electrode.

33. The electrochemical cell of claim 20, further comprising an insulating material configured to insulate at least a portion of the peripheral edge of the fuel electrode.

34. The electrochemical cell of claim 33, wherein the insulating material comprises plastic and/or epoxy.

35. A method for operating an electrochemical cell, wherein the cell comprises:
a fuel electrode comprising a series of permeable electrode bodies arranged in spaced apart relation;
an oxidant electrode spaced apart from the fuel electrode;
a charging electrode;
an ionically conductive medium communicating the electrodes;
wherein at least a portion of peripheral edges of the permeable electrode bodies are arranged in an inwardly stepped configuration in a direction of fuel growth;
wherein the method comprises:
charging the electrochemical cell by:
i. applying an electrical current between the charging electrode and at least one of the permeable electrode bodies of the fuel electrode with the charging electrode functioning as an anode and the at least one permeable electrode body functioning as a cathode, such that reducible fuel ions are reduced and electrodeposited as fuel in oxidizable form on the at least one permeable electrode body;
ii. said electrodeposition causing growth of the fuel among the permeable electrode bodies in the first direction such that the electrodeposited fuel establishes an electrical connection between the permeable electrode bodies; and iii, removing the electrical current to discontinue the charging.

36. The method of claim 35, wherein the charging electrode is selected from the group consisting of (a) the oxidant electrode, (b) a third electrode spaced from the oxidant electrode, and (c) one or more bodies of the fuel electrode.

37. An electrochemical cell comprising:
a fuel electrode comprising a series of permeable electrode bodies arranged in spaced apart relation;
an oxidant electrode spaced apart from the fuel electrode;
a charging electrode;
an ionically conductive medium communicating the electrodes;
wherein at least a portion of peripheral edges of the permeable electrode bodies are arranged in an inwardly stepped configuration in a direction of fuel growth;
wherein the spaced apart relation of said permeable electrode bodies of the fuel electrode enables an electrical current to be applied between the charging electrode and at least one of the permeable electrode bodies of the fuel electrode with the charging electrode functioning as an anode and the at least one permeable electrode body functioning as a cathode, such that reducible fuel ions are reduced and electrodeposited as fuel in oxidizable form on the at least one permeable electrode body, wherein the electrodeposition causes growth of the fuel among the permeable electrode bodies in the direction of fuel growth such that the electrodeposited fuel establishes an electrical connection between the permeable electrode bodies.

38. The electrochemical cell of claim 37, wherein the charging electrode is selected from the group consisting of (a) the oxidant electrode, (b) a third electrode spaced from the oxidant electrode, and (c) one or more bodies of the fuel electrode.

* * * * *

UNITED STATES PATENT AND TRADEMARK OFFICE
CERTIFICATE OF CORRECTION

PATENT NO. : 8,659,268 B2
APPLICATION NO. : 13/167930
DATED : February 25, 2014
INVENTOR(S) : Krishnan et al.

It is certified that error appears in the above-identified patent and that said Letters Patent is hereby corrected as shown below:

In the claims

Claim 22, Column 23, lines 53-67, should be deleted and insert therefor:
-- The electrochemical cell of claim 21, wherein the fuel electrode further comprises one or more intermediate permeable electrode bodies, the one or more intermediate permeable electrode bodies being in spaced relation between the distal permeable electrode body and the proximal permeable electrode body, wherein each of the permeable electrode bodies more proximal to the charging electrode has a lesser planar size than each of the permeable electrode bodies more distal to the charging electrode, such that along at least a portion of a peripheral edge of the fuel electrode, the edges of each of the proximal and intermediate permeable electrode bodies are located inward of the edge of the adjacent electrode body in the distal direction in a progressive manner. --

Signed and Sealed this
Twenty-third Day of February, 2016

Michelle K. Lee
*Director of the United States Patent and Trademark Office*